United States Patent [19]

Takeda et al.

[11] Patent Number: 5,615,191

[45] Date of Patent: Mar. 25, 1997

[54] DISC DEVICE HAVING ECCENTRICITY MEASUREMENT AND CLOCK CORRECTION

[75] Inventors: Toru Takeda, Saitama; Satoru Seko, Kanagawa; Hideaki Ishioka, Kanagwa; Itaru Tomisaki, Kanagawa, all of Japan

[73] Assignee: Sony Corporation, Tokyo, Japan

[21] Appl. No.: 555,542

[22] Filed: Nov. 9, 1995

Related U.S. Application Data

[63] Continuation of Ser. No. 159,620, Dec. 1, 1993, abandoned.

[30] Foreign Application Priority Data

| Dec. 4, 1992 | [JP] | Japan | 4-350578 |
| Feb. 23, 1993 | [JP] | Japan | 5-057764 |
| Mar. 2, 1993 | [JP] | Japan | 5-066248 |

[51] Int. Cl.⁶ ............................................. G11B 27/30
[52] U.S. Cl. ........................ 369/58; 360/51; 360/77.04
[58] Field of Search ............................... 360/51, 77.04; 369/58, 48, 124

[56] References Cited

U.S. PATENT DOCUMENTS

| 4,414,589 | 11/1983 | Oliver et al. | 360/77.08 X |
| 4,745,587 | 5/1988 | Maeda et al. | 369/32 |
| 4,764,914 | 8/1988 | Estes et al. | 360/77.04 X |
| 5,095,475 | 3/1992 | Ishikawa | 360/50 X |
| 5,297,131 | 3/1994 | Tanaka | 360/77.04 X |

FOREIGN PATENT DOCUMENTS

| 082390 | 6/1983 | European Pat. Off. . |
| 209692 | 1/1987 | European Pat. Off. . |
| 63-18579 | 1/1988 | Japan | 369/58 |

OTHER PUBLICATIONS

Patent Abstract of Japan, vol. 15, No. 156 (P-1192) Apr. 18, 1991, JP-A-03 025 767 (Sony), Feb. 4, 1991.

Patent Abstract of Japan, vol. 9, No. 323 (P-414) Dec. 18, 1985, JP-A-60 147 975 (Hitachi), Aug. 5, 1985.

Patent Abstract of Japan, vol. 13, No. 342 (P-908) Aug. 2, 1989 JP-A-01 100 777 (Matsushita), Apr. 19, 1989.

Patent Abstract of Japan, vol. 12, No. 359 (P-762) Sep. 27, 1988, JP-A-63 108 575 (Ricoh), May 13, 1988.

*Primary Examiner*—Aristotelis Psitos
*Assistant Examiner*—James T. Wilson
*Attorney, Agent, or Firm*—Jay H. Maioli

[57] ABSTRACT

A magnetic or optical disc device which can correctly follow the eccentricity of an eccentrically chucked disk and Which can immediately follow the eccentricity of the new disk face when there is a changeover of the disc being accessed operates with a disc having data tracks provided with uniformly spaced clock marks for providing a timing standard and includes a reproduction circuit for reproducing data from the disc, a clock sampling circuit for extracting a first clock signal output by the reproduciton circuit, an eccentricity magnitude memory section for storing a signal corresponding to the eccentricity of the data tracks with respect to the axis of rotation of the disc; a clock correction section. The device further includes a voltage control oscillator operating according to the signal corresponding to the eccentricity for causing a second clock signal output by the voltage control oscillator to follow the first clock signal by changing the phase of the second clock signal or the frequency of the second clock signal and an eccentricity magnitude measuring section for measuring the signal corresponding to the eccentricity from the first clock signal and the output signal of the reproduciton circuit and supplying it to the eccentricity magnitude memory section. The eccentricity magnitude measuring section measures the signal corresponding to the eccentricity by calculating the number of tracks which the reproduction head crosses or by using the non-uniformity of spacing observed in a string of clock pulses reproduced from the uniformly spaced clock marks on the disc.

28 Claims, 25 Drawing Sheets

5,615,191

DISC DEVICE HAVING ECCENTRICITY MEASUREMENT AND CLOCK CORRECTION

This is a continuation of application Ser. No. 08/159,620 filed Dec. 1, 1993, now abandoned.

BACKGROUND OF THE INVENTION

1. Field of the Invention

The present invention relates to a disk unit such as a magnetic disk unit or an optical disk unit and more particularly to a clock signal correcting circuit suitable for a so-called "sampled servo system" disk unit in which a plurality of clock marks which provide a timing standard are embedded in data tracks on the surface of the disks beforehand at the time of manufacture.

2. Description of the Prior Art

The construction of one example of a conventional clock generating circuit of the kind to which this invention relates is shown in FIG. 1. The clock generating circuit shown in FIG. 1 is a so-called PLL (Phase Locked Loop) circuit. The PLL circuit 130 comprises a phase comparator 131, a loop filter 132, a VCO (voltage controlled oscillator) 135 and a frequency divider 136. A clock signal reproduced from a disk is supplied to one of the inputs of the phase comparator 131. A clock signal output from the VCO 135 whose frequency is divided by N by the frequency divider 136 is supplied to the other input of the phase comparator 131. The loop filter 132 performs a prescribed filtering process such as lowpass filtering on the output of the phase comparator 131 and supplies its output to the VCO 135. The VCO 135 outputs a clock signal that corresponds to the input voltage. The resulting clock signal output from the VCO 135 is locked to the phase of the reproduced signal from the disk.

The conventional clock generating circuit described above has the following problems in generating accurate clock signals.

(1) A significant phase fluctuation is generated in the clock signal reproduced from the tracks because the effective peripheral velocity fluctuates to the high speed side where the actual track circle radius is large and to the low speed side where the actual track circle radius is small due to an offset, i.e. eccentricity (It is noted that this eccentricity is different than the 'eccentricity magnitude' referred to hereinafter; 'eccentricity magnitude' refers to a quantity which expresses as a function the phase difference between the clock recorded at predetermined angular positions on the disc, having the home index signal generation position as its reference origin, and the first clock mentioned above.), introduced when the disc is chucked onto the spindle, of the center of the axis of rotation from the center of the track circles.

(2) If the low-pass gain of the PLL loop is increased in order to fully suppress the phase fluctuation caused by the eccentricity, the PLL cannot be made to correctly adapt to the eccentricity of the disk because noise increases in the highpass area due to the widening of the band.

(3) Further, in a memory unit containing a plurality of disk faces, when the disc being accessed is changed over it is difficult to immediately adapt to the eccentricity of the newly accessed disk if the eccentricities of the disks before and after the changeover differ.

OBJECT AND SUMMARY OF THE INVENTION

This invention was devised in view of these problems, and one of its objects is to provide a disc device which can correctly adapt to the eccentricity of the disk.

A second object of the present invention is to provide a disc device which can immediately adapt to the eccentricity of the disk face to be accessed when it is changed among a plurality of disk faces.

In order to achieve these objectives, a disc device according to the present invention comprises: a disc, having data tracks provided in advance with a plurality of clock marks for providing a timing standard; reproduction means, including a reproduction head, for reproducing information recorded on the disc; clock sampling means, for extracting a first clock signal output by the reproduction means; eccentricity magnitude memory means, for storing a signal corresponding to the eccentricity of the data tracks with respect to the axis of rotation of the disc; and clock correction means, including voltage control oscillator means, for, according to the signal corresponding to the eccentricity, causing a second clock signal output by the voltage control oscillator means to follow the first clock signal by changing the phase of the second clock signal or the frequency of the second clock signal.

The disc device is also provided with home index sampling means, for sampling a home index signal indicating the rotational phase origin of the disc from the output of the reproduction means, and the signal corresponding to the eccentricity is a signal in which the phase difference between the clock at prescribed angular positions on the disc and the first clock is expressed as a function and which has the home index signal generation position as a reference origin.

The clock correction means comprises: phase comparison means, for comparing the phase of the first clock signal with the phase of the second clock signal; filtering means, for performing prescribed filtering on the output of the phase comparison means; and adding means, for, in synchrony with the disc rotation, adding the output of the filter means to the signal corresponding to the eccentricity and supplying the resulting signal to the voltage control oscillator means.

The disc device also comprises: eccentricity magnitude measuring means, for measuring the signal corresponding to the eccentricity from the first clock signal and the output signal of the reproduction means and supplying it to the eccentricity magnitude memory means.

This eccentricity magnitude measuring means uses some method such as measuring the signal corresponding to the eccentricity, by calculating the number of tracks which the reproduction head crosses or by obtaining the signal corresponding to the eccentricity from the non-uniformity of spacing observed in a string of originally uniformly spaced clock pulses reproduced from the disc.

Also, the disc device comprises: a plurality of discs, each disc having data tracks provided with a plurality of clock marks for providing a timing standard; reproduction means, including a reproduction head, for reproducing information recorded on the discs; track number sampling means, for sampling the track numbers of the disc from the output of the reproduction means; clock sampling means, for extracting a first clock signal from the output of the reproduction means; eccentricity magnitude measuring means, for measuring a signal corresponding to the eccentricity of the data tracks of each disc with respect to the axis of rotation of the disc from the first clock signal and the output signal of the reproduction means; eccentricity magnitude memory means, for storing the signal corresponding to the eccentricity; eccentricity magnitude adjusting means, for changing the signal corresponding to the eccentricity stored in the eccentricity magnitude memory means according to the sampled track number; clock correction means, including a voltage controlled oscillator means, for, according to the signal corresponding to the eccentricity changed by the eccentricity adjusting means, causing a second clock signal output by the voltage controlled oscillator to follow the first clock signal by changing the phase of the second clock signal or the frequency of the second clock signal.

The disc device further comprises home index sampling means, for sampling a home index signal indicating the rotational phase origin of the disc from the output of the reproduction means.

The signal corresponding to the eccentricity is a signal in which the phase difference between the clock at prescribed angular positions in the disc and the first clock is expressed as a function and which has the home index signal generation position as its reference origin.

The eccentricity magnitude adjusting means comprises: adjustment coefficient memory means, for storing, in correspondence with the sampled track numbers, the amplitudes of the time intervals of the clock mark reproduction signals as adjustment coefficients for use in adjusting the signal corresponding to the eccentricity; and multiplying means, for multiplying the signal corresponding to the eccentricity stored in the eccentricity magnitude memory means by the adjustment coefficients stored in the adjustment coefficient memory means.

And the disc device further comprises: phase difference memory means, for storing, in correspondence with the sampled track numbers, the phase difference between the home index of the axis of rotation of the disc and the home index on the data tracks, and for outputting the phase differences according to inputted track numbers; and readout means, for, according to the phase difference output by the phase difference memory means, reading out signals corresponding to the eccentricity and supplying them to the multiplying means.

DETAILED DESCRIPTION OF PREFERRED EMBODIMENTS

[1] First Preferred Embodiment

Figure 1:
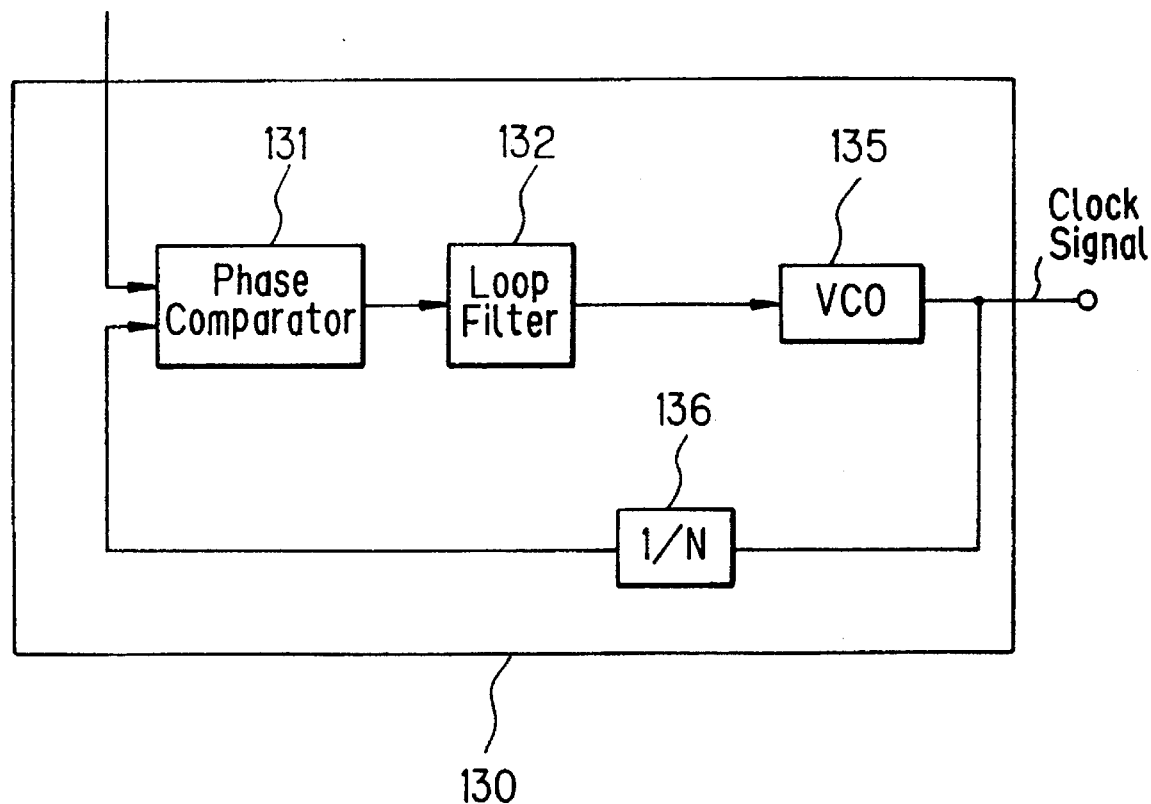
FIG. 1 is a block diagram illustrating one example of a clock generating circuit in a conventional disc device.
Figure 2:
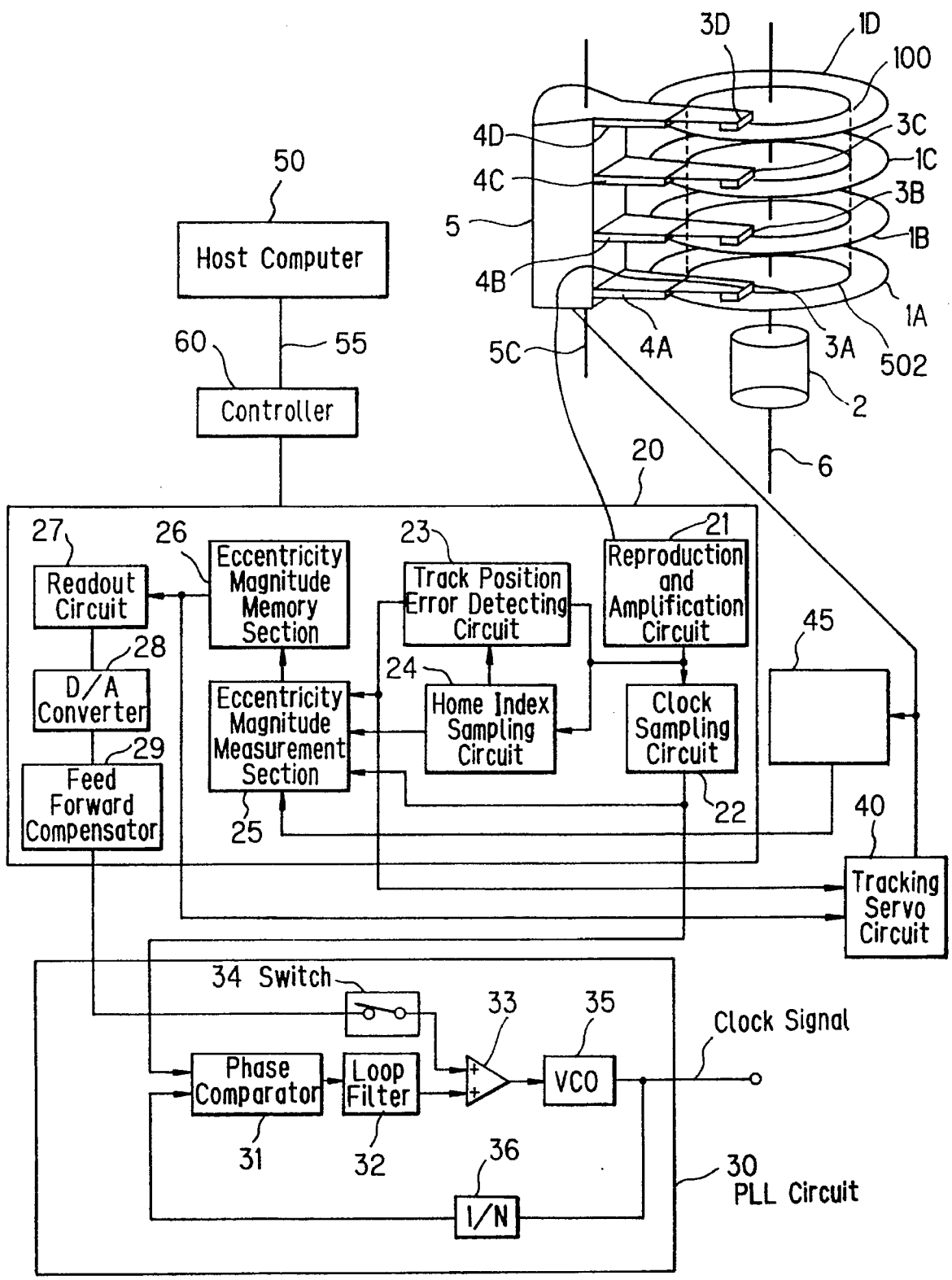
FIG. 2 is a block diagram illustrating a first embodiment of a disc device according to the present invention.

Referring now to the accompanying drawings, preferred embodiments of the present invention will be explained in detail. FIG. 2 is a block diagram showing the structure of a first embodiment in which the present invention is applied to a magnetic hard disk unit. Double-sided magnetic disks 1A, 1B, 1C and 1D are rotated and driven by a spindle motor 2. Magnetic heads 3A, 3B, 3C and 3D are supported by arms 4A, 4B 4C and 4D and are turned about the turning center 5C by a voice coil motor (VCM) 5 to follow tracks 502 on the upper sides of the double-sided magnetic disks 1A, 1B, 1C and 1D and to write/read data to/from those tracks. The tracks 502 of those four magnetic disks 1A, 1B, 1C and 1D form a cylinder 100. Although not shown, four magnetic heads for writing/reading data to/from the back sides of the double sided magnetic disks 1A, 1B, 1C and 1D are provided and are supported by the arms 4A, 4B, 4C and 4D in the same way as the magnetic heads 3A, 3B, 3C and 3D and are turned about the turning center 5C by the VCM 5. A plurality of clock marks for providing a timing standard are embedded in the data tracks on the surface of the magnetic disks 1A, 1B, 1C and 1D beforehand when the disks are manufactured. The reference numeral (6) denotes the center of rotation of the spindle motor 6, i.e. the center of rotation of the magnetic disks 1A, 1B, 1C and 1D.

A host computer 50 supplies commands such as write and read commands to a controller 60 via an interface cable 55. The controller 60 outputs control signals for controlling the magnetic hard disk unit to a signal processing circuit 20.

Reproduced signals read out from the magnetic disks 1A, 1B, 1C and 1D by the magnetic heads 3A, 3B, 3C and 3D are amplified to a predetermined amplitude by a reproduction and amplification circuit 21. The output of the reproduction and amplification circuit 21 is fed to a clock sampling circuit 22, a track position error detecting circuit 23, and a home index (one pulse per 1 revolution) sampling circuit 24. The reproduced clock signal sampled by the clock sampling circuit 22 is supplied to a track eccentricity magnitude measurement section 25. A track position error signal output from the track position error detecting circuit 23 is also supplied to the track eccentricity magnitude measurement section 25. Further, a home index signal sampled by the home index sampling circuit 24, i.e. a rotational phase origin signal is also supplied to the track eccentricity magnitude measurement section 25.

The track eccentricity magnitude measurement section 25 measures the eccentricity magnitude of the data track circle 502 from the center of the axis of rotation 6 as a function of angular position θ on the disk, where a home index generating position is set at zero degrees of angular coordinate value by a known method or by a method of the present invention described later, and stores it in an eccentricity magnitude memory section 26 in table form. A tracking servo circuit 40 utilizes this eccentricity magnitude for controlling the VCM 5. As explained above, this eccentricity magnitude is a different quantity from the 'eccentricity' mentioned above. That is, 'eccentricity magnitude' refers to the phase shift that originates in the eccentricity introduced during disc chucking, and, more specifically, refers to a signal which expresses as a function the phase difference between the clock at predetermined angular positions in the disc, having the home index signal generation position as the reference origin, and the first clock. 'Eccentricity Magnitude' is used with this meaning hereinafter throughout the description of the preferred embodiments.

One of the features of the present embodiment shown in FIG. 2 is that the eccentricity magnitude stored in the memory section 26 is additionally applied in a feed forward manner as the control voltage of a voltage controlled oscillator (VCO) 35 in a PLL circuit 30 after being read out in synchronization with the rotation of the disk by a read circuit 27, being converted into an analog signal by a D/A converter 28 and being compensated or converted into a velocity signal by a feed forward compensator 29.

The PLL circuit 30 comprises a phase comparator 31, a loop filter 32 for performing a prescribed filtering process such as lowpass filtering on the output of the phase comparator 31, and the VCO 35 for outputting a clock signal having a phase or frequency that corresponds to the output of the loop filter 32. The phase comparator 31 outputs the phase difference between the clock signal sampled by the clock sampling circuit 22 and the clock signal fed back from the VCO 35 via a 1/N frequency divider 36. The present embodiment shown in FIG. 2 is characterized in that an analog adder (operational amplifier) 33 is provided between the loop filter 32 and the VCO 35 and that a signal supplied from the feed forward compensator 29 via a switch 34 is added to the signal output from the loop filter 32 and is supplied to the VCO 35. The loop filter 32 and adder 33 may be a digital computing element.

Because the PLL circuit 30 is constructed as described above, the VCO 35 is driven not only by the output from the phase comparator 31 but also by a track circle eccentricity indicating voltage arriving from the eccentricity magnitude memory section 26 via the read circuit 27, the D/A converter 28, the feed forward compensator 29 and the switch 34. Accordingly, the VCO 35 adapts pulse signals of 840 pulses per revolution generated from the disk by the so-called closed loop operation and also performs an open loop operation with a present instantaneous eccentricity magnitude predicting signal from the memory section 26.

That is, when a disk having this kind of eccentricity is operated, the clock from the disk observed from the reproduction head fixed in the θ direction has a fluctuation compressed in the direction of the time axis. In terms of the component, among components of this fluctuation, that corresponds to the rotational frequency, because the VCO 35 is intentionally "excited" mostly by the open loop operation described above, the clock signal output from the clock sampling circuit 22 and the clock signal output from the VCO 35 are caused to approach the same phase of about±20 ns (nano-seconds).

Due to the convergence brought about by this open loop operation, the closed loop operation only needs to eliminate mostly the high frequency components (several times to several tens of times of the rotational frequency) whose amplitudes are smaller among the fluctuation components. As a result, in terms of the adaptive quality realized, the output signal of the VCO 35 can be maintained finally in a very close oscillation phase of less than±1 ns from the clock signal output from the clock sampling circuit 22.

As for the shape of the data track circles, because in the present embodiment the original disk is manufactured by a cutting machine having a feed precision of around 0.01 micron, similar to that of an optical disk manufacturing machine, its roundness is sufficiently better than 1 micron.

However, when such a disk is mounted on the axis of rotation, a mounting error of 10 to 50 microns is created between the center of the disk, i.e the center of the data track circles, and the axis of rotation.

There are several ways to measure this offset (eccentricity).

The eccentricity magnitude measurement section will now be described in detail.

It is noted that the eccentricity magnitude measurement methods discussed below are also applicable to other preferred embodiments which will be described hereinafter.

(1) First Eccentricity Magnitude Measurement Method

This first method is the most direct method. That is, the magnetic disks 1A, 1B, 1C and 1D are rotated after restricting the magnetic heads 3A, 3B, 3C and 3D both in the R and θ directions. It will now be supposed that a disk whose track width is 10.0 μm and whose eccentricity is 50 μm is mounted. Seeing from the side of the reading head, a phenomenon is observed that about 5 tracks escape to the peripheral side and then return to the inner side as the disk rotates. Accordingly, an approximate eccentricity magnitude can be found by counting the number of tracks crossed.

In this example, an observed magnitude was 5 tracks×10 μm/per track=50 μm, and anticipating 5 μm of uncertainty, the eccentricity is judged to be 50±5 μm.

However, this method does not allow measurement with better resolution than one track, i.e. 10 μm. Therefore, the follow-up characteristics of the VCO 35 cannot be described as ideal.

(2) Second Eccentricity Magnitude Measurement Method

In a second eccentricity measuring method, a track number is given to every track from the inner periphery to the outer periphery, and the marks are marked with an adequate repetitive frequency across one rotation of all the tracks beforehand when the disk is fabricated. In the present embodiment, the number of the marks is 840 per rotation. Then a virtual closed loop servo is activated so that only the same track number is followed up by track number reading means (not shown) and the tracking servo circuit 40. Thus a drive current that virtually follows up the eccentricity of the disk is generated in the VCM 5. Values of the current supplied from the tracking servo circuit 40 to the VCM 5 are detected by a current detector 45 every moment and are stored in the eccentricity magnitude memory section 26 as time series data that corresponds to one rotation in a digital format.

(3) Third Eccentricity Magnitude Measurement Method

Whereas in the first and second eccentricity measuring methods the eccentricity of the track seen from the reproducing head side is measured directly, this third eccentricity magnitude measuring method finds the eccentricity magnitude from unequal intervals observed in a clock pulse train reproduced from one track which has originally equal intervals and stores the result in the memory section 26.

Figure 3:
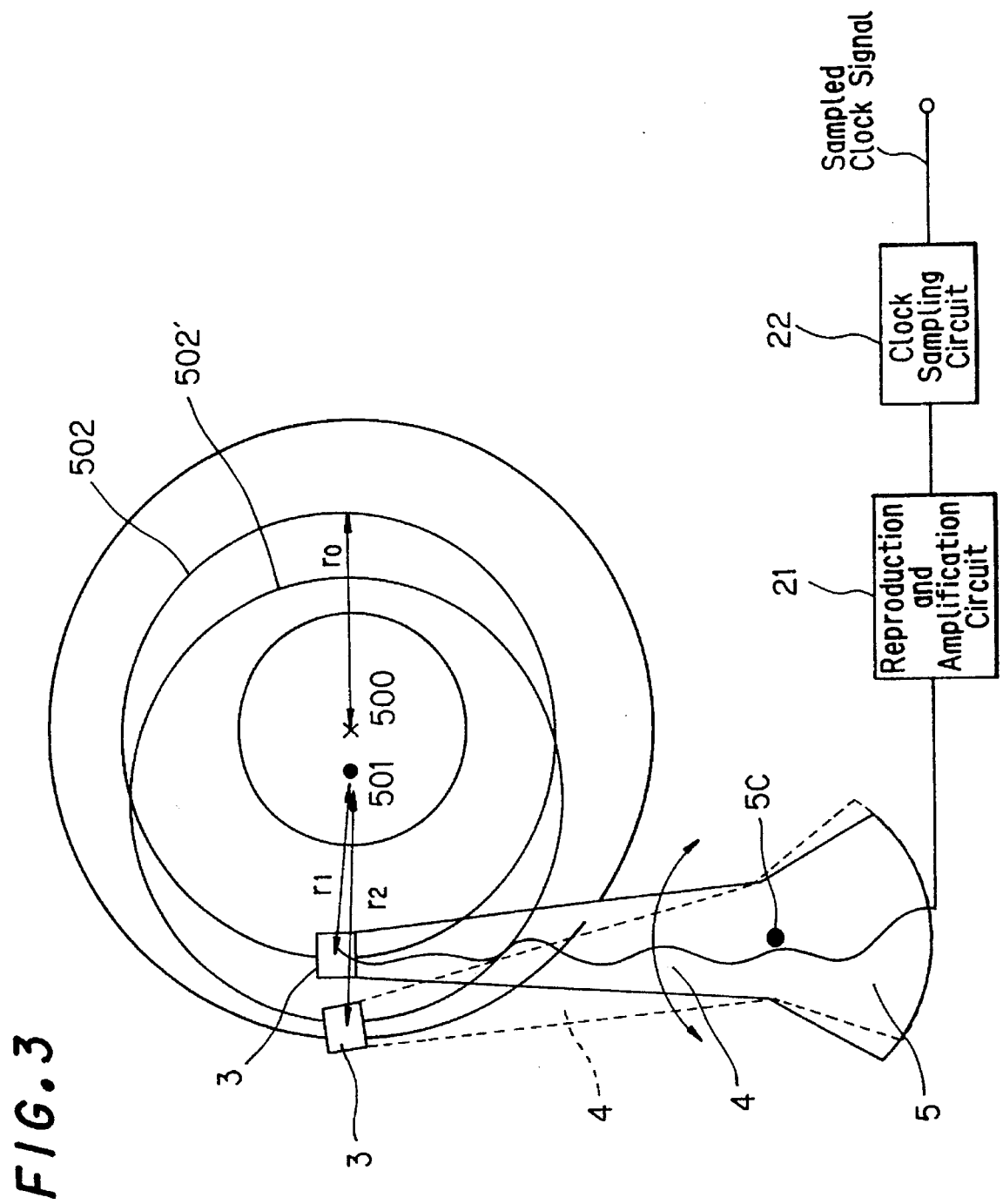
FIG. 3 is an explanatory drawing illustrating one example of noncoincidence of the center of the tracks of a disk and the center of rotation of the disk, i.e. disc eccentricity.

Referring now to FIG. 3, the third eccentricity measuring method will be explained. In the figure, the reference numeral (500) indicates the center of the track 502 and (501) indicates the center of rotation of the disk. The reproducion head 3 is supported by the arm 4 and is positioned by the tracking servo circuit 40 so that it traces along the center of the track 502.

When the radius of the track 502 is r0 (m), the eccentricity is d (m), and the number of rotations is N (Hz), the average peripheral velocity V0 of the track 502 is:

$$V0 = 2\pi r0 \times N \ (m/sec) \quad \text{Equation 1}$$

When the number of pulses contained in the circular track 502 with r0 of radius is M pulses per rotation, the distance L0 between two pulses may be expressed as:

$$L0 = 2\pi r0/M \quad \text{Equation 2}$$

The time T0 necessary for the head to cover this distance between two pulses is:

$$T0 = L0/V0 = (2\pi r0/M)/(2\pi r0 \times N) \quad \text{Equation 3}$$
$$= 1/(N \times M)$$

If for example N=60.0 Hz and M=840, $$T0 = 19.841 \ (\mu sec) \quad \text{Equation 4}$$

On the other hand, the pulse frequency T2 of a portion where the radius is increased due to the eccentricity d to r2=r0+d becomes:

$$T2 = 2\pi r0/M/(2\pi r2 \times N) \quad \text{Equation 5}$$
$$= r0/r2 \times 1/(N \times M)$$

Therefore, when r0=20 mm and r2=20.05 mm, T2 becomes T0×0.9975, changing by 0.25%. Although this is small, it is a magnitude in the time domain, and therefore it can be measured relatively accurately.

That is, in this example, while T0=19.841 (μs), T1=19.891 and T2=19.792 (μs), so that there is a difference of about 50 ns between the average value and the maximum value and between the average value and the minimum value of T. Since this can be measured with present electronics technology with good accuracy, the measurement of the eccentricity magnitude can be resolved into the measurement of these time intervals.

Since it is difficult to prepare such a constant velocity time standard in actual measuring operations, the following method is adopted.

Figure 4:
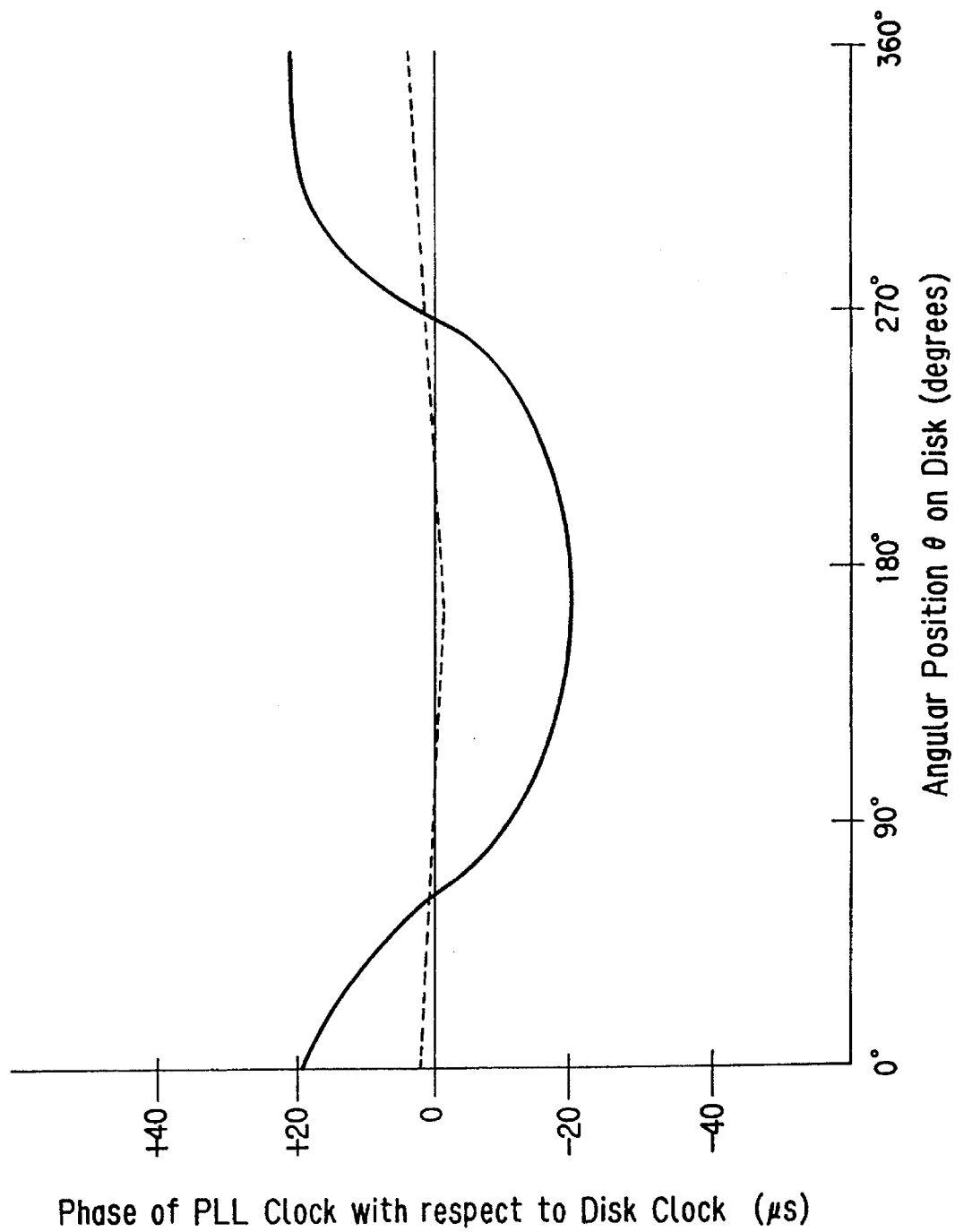
FIG. 4 is a graph comparing the phase of a clock signal sampled from a disk and the phase of a clock signal output by the VCO 35 of the PLL loop 30 of FIG. 2.

That is, instead of the constant velocity time standard, the switch 34 in FIG. 2 is kept in the open state to operate the PLL circuit 30 only in a closed loop and the output from the VCO 35 at this time is taken as a time standard. Based on this time standard, the phase of the reproduced clock from the clock sampling circuit 22 is measured across one circuit. At this time, 840 time data are observed as shown in FIG. 4. Because the time standard used at this time is the output of the PLL circuit 30 following up in the closed loop and the time standard itself also is following up the eccentricity by loop gain, the observed result is already suppressing the eccentricity to some extent.

Accordingly, the shift of the phase from the true time axis caused by the eccentricity is the observed result multiplied by the loop gain (normally a constant less than 100). Since the observed value is±18 ns, and the loop gain at 60 Hz is 40 times, one point on the disk is causing a delay of advancement of±720 ns from the constant velocity time axis.

The preparation of the eccentricity table is completed by storing the delays of advancement observed in one revolution in the memory section 26 as digital numerical values.

The feed forward control of the VCO 35 of the present invention using the eccentricity table stored thus in the memory section 26 is carried out as follows.

First, the content of the memory section 26 is read out by the read circuit 27 in synchronization with the rotational phase of the disk and is converted into an analog voltage by the D/A converter 28. Then after being phase compensated through the feed forward compensator 29 composed of a coil L, capacitor C and resistor R, it is applied to the VCO 35 via the switch 34 and the analog adder 33. As a result, the oscillation phase of the VCO 35 approaches zero degrees across the whole range of one rotation, as shown by the broken line in FIG. 4.

(4) Fourth Eccentricity Magnitude Measurement Method

Figure 5:
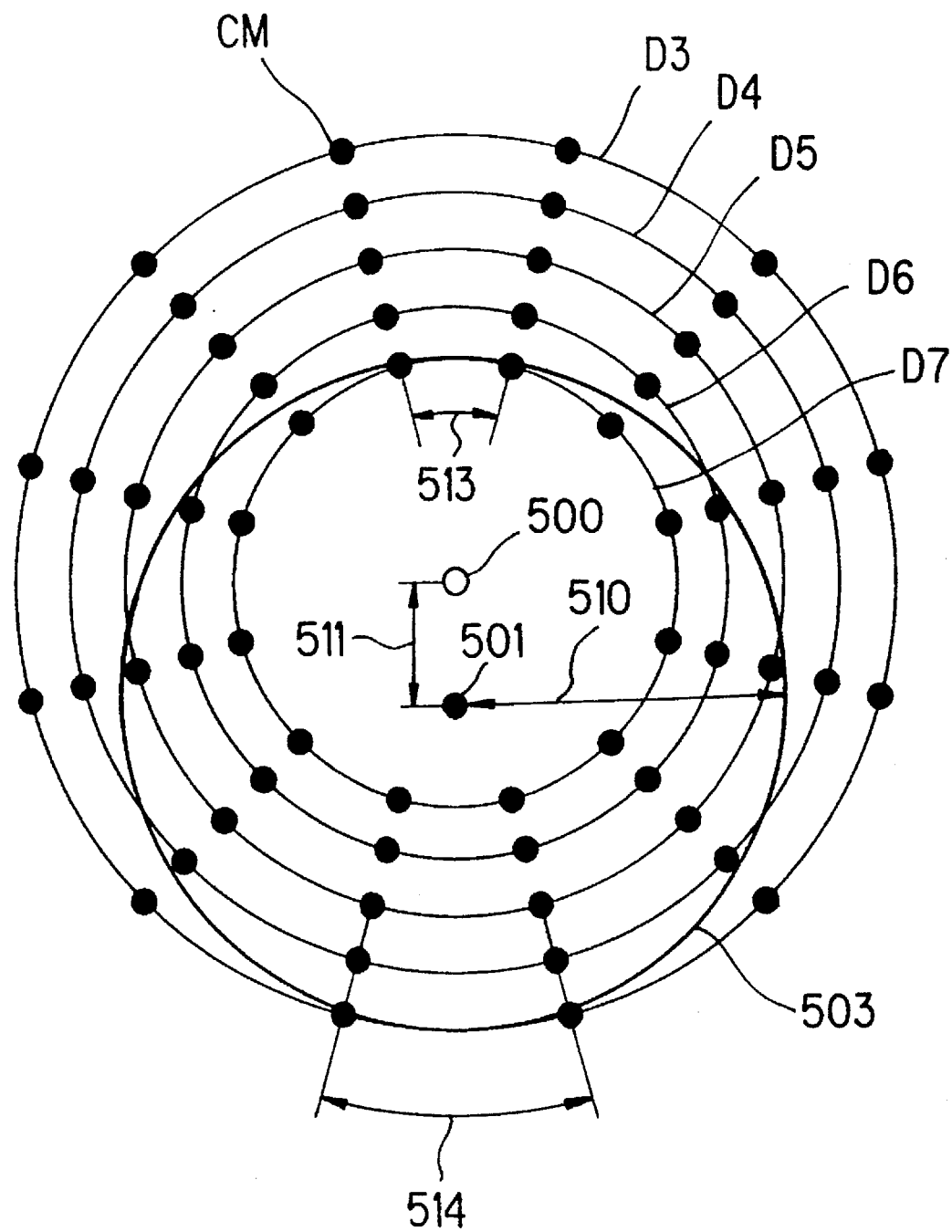
FIG. 5 is a view illustrating the relationship between a disc having N clock mark signals recorded on it at physically uniform intervals around each of its circular data tracks and the locus of a recording and reproduction head, i.e. a signal readout head, positioned at a fixed radius from the center of rotation of the chucked disc.

FIG. 5 illustrates the relationship between a magnetic disc on which N clock mark signals, physically spaced at uniform intervals, are recorded on each of the circular data tracks, and the locus described by a recording and reproduction head, i.e. a signal readout head, when the head is positioned at a fixed radius from the center of rotation of the chucked disc. In FIG. 5, reference numeral 500 denotes the center of the circular data tracks; data tracks 3 through 7 lie in concentric circles about this center 500, and N clock mark signals CM are recorded on each of the data tracks, physically spaced at uniform intervals around the disc.

When a magnetic disc having circular data tracks like the one described above is chucked onto the rotating shaft 501 of a spindle motor, an eccentricity 511 occurs. Reference numeral 503 denotes the circular locus described by a recording and playback head, i.e. a signal readout head, when the head is positioned at a fixed radius 510 from the center of rotation 501 of the chucked disc. The head travels the distance 513 between the clock mark signals CM in the circular data track through which the circular locus 503 passes when the head is closest to the center 500 of the data tracks in the shortest time, and takes the longest time to travel the distance 514 between the clock marks in the circular data track through which the circular locus 503 passes when the head is farthest from the center 500 of the data tracks. This is because the disc rotation radius 510 and the head speed are constant.

Therefore, by measuring the time intervals between the clock mark reproduction signals reproduced by a recording and reproduction head, i.e. a signal readout head, when the head is positioned at a fixed radius 510 from the center of rotation 501 of the chucked disc, and by using these measurements, the eccentricity magnitude of the disc, caused by the eccentricity 511, for any angular position of the disc can be obtained.

Figure 6:
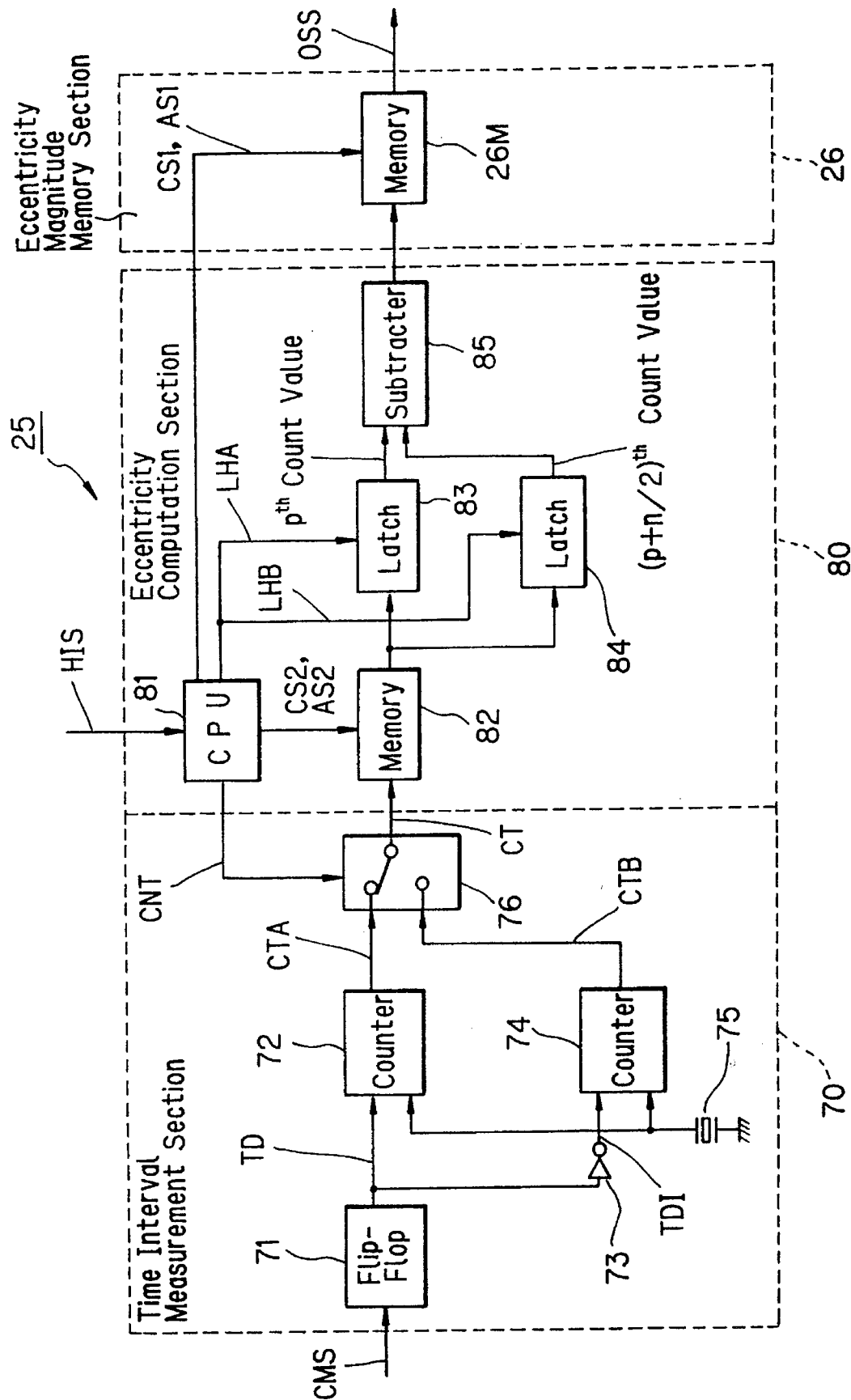
FIG. 6 is a block diagram showing a first detailed construction of an eccentricity magnitude measurement section according to the present invention.

FIG. 6 illustrates a construction for practicing the fourth eccentricity measurement method of this invention.

A time interval measurement section 70 uses the home index signal HIS to measure the time intervals between clock mark reproduction signals CMS outputted by a clock sampling circuit 22. An eccentricity magnitude computing section 80 uses the home index signal HIS to calculate the eccentricity magnitude with angular position of the disc 1 from the time intervals between the clock mark reproduction signals CMS. The CPU 81 is also provided with memory access functions.

During memory access, a control signal CS1 and an address signal AS1 are output by the CPU 81 based on the home index signal HIS. An eccentricity magnitude memory section 26 stores eccentricity magnitudes output by the eccentricity magnitude computing section 80 according to the control signal CS1 and the address signal AS1. During memory access, the eccentricity magnitudes stored in the eccentricity memory section 26 are read out in accordance with the control signal CS1 and the address signal AS1 output by the CPU 81 based on the home index signal HIS. The eccentricity magnitudes read out from the eccentricity memory 26 give the eccentricity distances of the circular data tracks of the disc 1 from the head locus 503 (see FIG. 5).

In the example shown in FIG. 6, the time interval measurement section 70 includes a flip-flop 71, a counter 72, an invertor 73, a counter 74, an oscillator 75, and a switch 76. The eccentricity magnitude computing section 80 includes the CPU 81, a memory 82, latches 83 and 84, and a subtracter 85. The eccentricity magnitude memory section 26 includes a memory 26M.

Every time a clock mark reproduction signal CMS reproduced from the disc arrives, the flip-flop 71 outputs a pulse signal TD which changes between High and Low at the TTL level. This pulse signal TD is supplied directly to the counter 72 and is also supplied to the counter 74 after being reversed by the invertor 73.

The counter 72 uses the oscillator 75 to measure the time intervals during which the pulse signal TD is High, and outputs time interval measured values CTA. The counter 74 uses the oscillator 75 to measure the time intervals during which the pulse signal from the invertor 73 is High, i.e. the time intervals during which the pulse signal TD is Low, and outputs time interval measured values CTB.

The switch 76 outputs the time interval measured values CTA output by the counter 72 and the time interval measured values CTB output by the counter 74 alternately as count values CT, according to a control signal CNT output by the CPU 81 based on the home index signal HIS. The memory 82 stores in order (N+N/2) time interval measured values CT supplied from the switch 76, according to a control signal CS2 and an address signal AS2 output by the CPU 81 based on the home index signal HIS.

The time interval measured values stored in the memory 82 are read out according to the control signal CS2 and the address signal AS2 output by the CPU 81. The $p^{th}$ time interval measured value read out is held in the latch 83 according to a latch signal LHA output by the CPU 81. The $(p+N/2)^{th}$ time interval measured value read out is held in the latch 84 according to a latch signal LHB output by the CPU 81.

The subtracter 85 subtracts the $(p+N/2)^{th}$ time interval measured value from the $p^{th}$ time interval measured value. The subtracter 85 performs this subtraction for p=1 through p=N. The N results thus obtained by the subtracter 85 are stored in order in the memory 26M according to the control signal CS1 and the address signal AS1 output by the CPU 81 based on the home index signal HIS.

The subtraction results stored in the memory 26M represent the eccentricity magnitude with angular position of the disc, and give the distance, due to eccentricity, of the circular data tracks from the head locus 503 (see FIG. 5); they are read out as eccentricity magnitudes OSS according to the control signal CS1 and the address signal AS1 output by the CPU 81 based on the home index signal HIS, and can be used as an eccentricity distance table for performing eccentricity correction.

Figure 7:
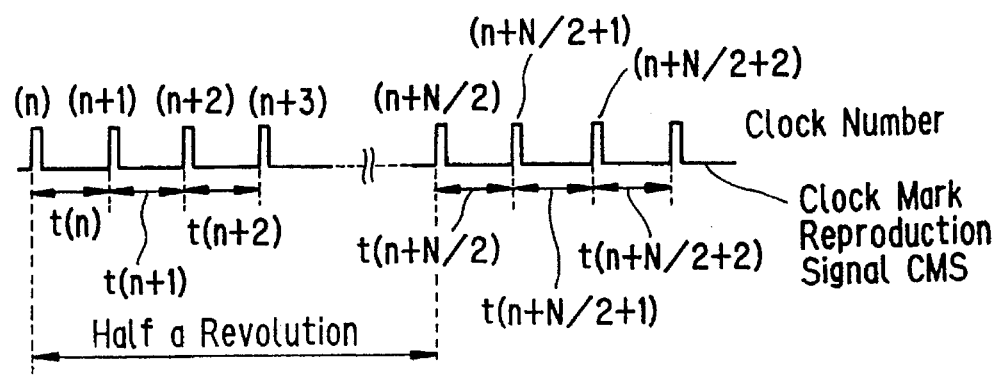
FIG. 7 is a view illustrating the relationship between the clock mark reproduction signals and the measured time intervals in the first detailed construction of an eccentricity magnitude measurement section according to the present invention shown in FIG. 6.

FIG. 7 shows the relationship between the clock mark reproduction signals CMS and the measured time intervals in the example construction shown in FIG. 6. In FIG. 7, with the count value of the time interval between the $n^{th}$ clock mark reproduction signal CMS and the $(n+1)^{th}$ clock mark reproduction signal CMS expressed as t(n), when the count value for when the locus 503 of FIG. 5 is farthest from the circular data track center 500 is written as t(k), the count value for when the locus 503 is closest to the data track center 500 is t(k+N/2).

Figure 8:
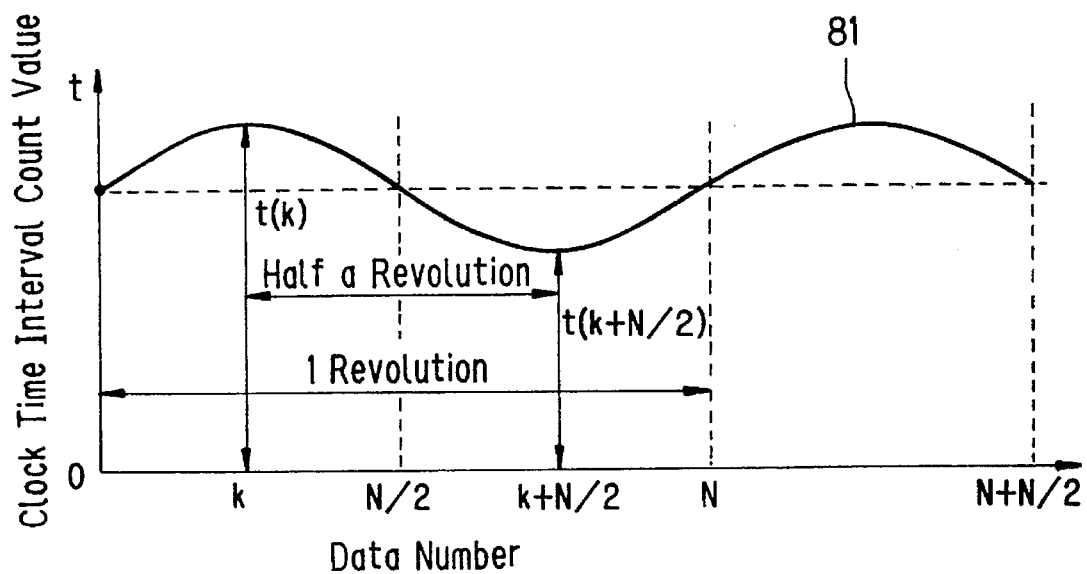
FIG. 8 is a view illustrating an example of a clock mark reproduction signal time interval measured by a time interval measurement section 70 constructed as shown in FIG. 6.

FIG. 8 shows an example of a clock mark reproduction signal time interval measured by a time interval measuring section 70 constructed as shown in FIG. 6, i.e. the string of count values CT stored in the memory 82 plotted against their data numbers. In FIG. 8, the count value for when the locus 503 of FIG. 5 is farthest from the circular data track center 500 is t(k), and the count value for when the locus 503 is closest to the data track center 500 is t(k+N/2).

Figure 9:
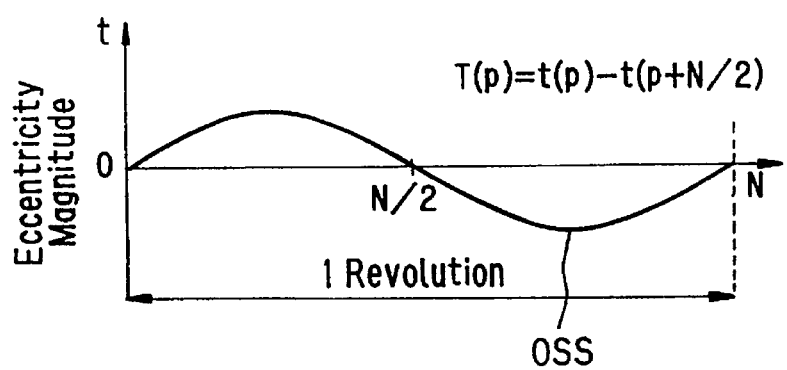
FIG. 9 is a view illustrating an example of an eccentricity magnitude/disc angle curve stored in the memory 26M of an eccentricity magnitude memory section 26 constructed as shown in FIG. 6.

FIG. 9 shows an example of the eccentricity magnitude stored in association with the disc angle in the memory 26M of an eccentricity magnitude memory section constructed as shown in FIG. 6, i.e. the eccentricity measurement results showing the distance, due to eccentricity, of the circular data tracks from the head locus 503 (see FIG. 5), obtained by subtracting the $(p+N/2)^{th}$ time interval measured value from the $p^{th}$ time interval measured value as described above. The data string OSS stored in the memory 26M can be used as a table of eccentricity distance with disc angular position for eccentricity correction.

(5) Fifth Eccentricity Magnitude Measurement Method

Figure 10:
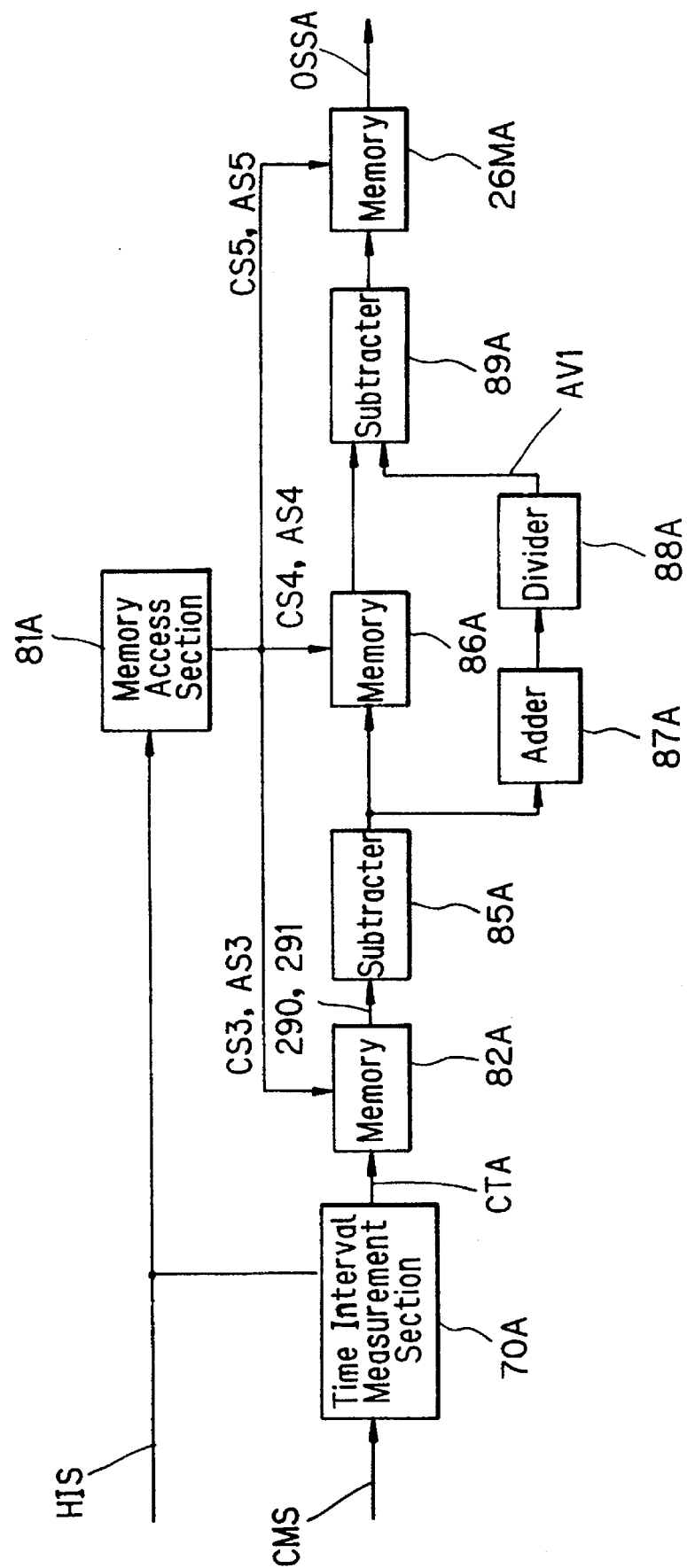
FIG. 10 is a block diagram illustrating a second detailed construction of an eccentricity magnitude measurement section according to the present invention.

FIG. 10 illustrates a construction for practicing a fifth eccentricity magnitude measurement method of this invention.

A time interval measurement section 70A uses a home index signal HIS to measure the time interval between the $n^{th}$ clock mark reproduction signal CMS reproduced from the disc and the $(n+m)^{th}$ clock mark reproduction signal CMS reproduced from the disc for all integers m from m=1 to m=(N+N/2). The time interval measured values measured by the time interval measuring section 70A are stored in order in a memory 82A according to a control signal CS3 and an address signal AS3 output by a memory access section 81A based on the home index signal HIS.

The time interval measured values stored in the memory 82A are read out according to the control signal CS3 and the address signal AS3 output by the memory access section 81A based on the home index signal HIS. A subtracter 85A subtracts the $(p+N/2)^{th}$ time interval measured value read out from the $p^{th}$ time interval measured value read out for all integers p from p=1 to p=N. The subtraction results obtained by the subtracter 85A are stored in order in a memory 86A according to a control signal CS4 and an address signal AS4 output by the memory access section 81A based on the home index signal HIS.

The subtraction results obtained by the subtracter 85A are also summed in an adder 87A into sums of the values of N results, and a divider 88A divides the summing results obtained by the adder 87A by N and outputs average values AV1.

The subtraction results stored in the memory 86A are read out in order according to the control signal CS4 and the address signal AS4 output by the memory access section 81A based on the home index signal HIS. A subtracter 89A subtracts the average value AV1 from the $k^{th}$ subtraction result read out for all integers k from k=1 to k=N. The subtraction results obtained by the subtracter 89A are stored in order in a memory 26MA according to a control signal CS5 and an address signal AS5 output by the memory access section 81A based on the home index signal HIS.

The subtraction results stored in the memory 26MA represent the eccentricity magnitude with angular position of the disc, and give the distance, due to eccentricity, of the circular data tracks from the head locus 503 (see FIG. 5); they are read out as eccentricity magnitudes OSSA according to the control signal CS5 and the address signal AS5 output by the memory access section 81A based on the home index signal HIS, and can be used as an eccentricity distance table for performing eccentricity correction. With the measurement method shown in FIG. 10, noise can be reduced further than is possible with the method shown in FIG. 6.

Figure 11:
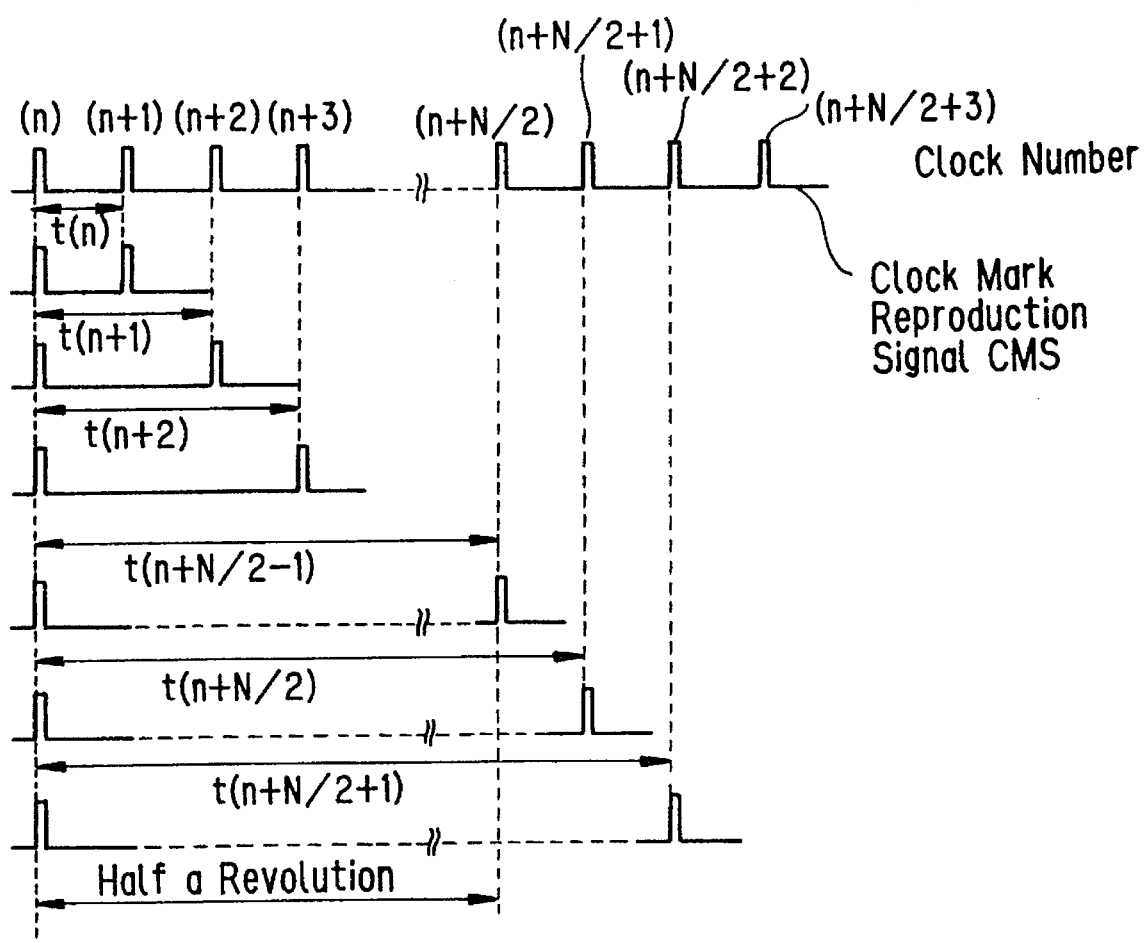
FIG. 11 is a view illustrating the relationship between the clock mark reproduction signals and the measured time intervals in the second detailed construction of an eccentricity magnitude measurement section shown in FIG. 10.

FIG. 11 shows the relationship between the clock mark reproduction signals and the measured time intervals obtained in the measurement method shown in FIG. 10. In FIG. 11, the time interval between the $n^{th}$ clock mark replay signal CMS and the $(n+m)^{th}$ clock mark reproduction signal CMS is t(n+m−1).

Figure 12:
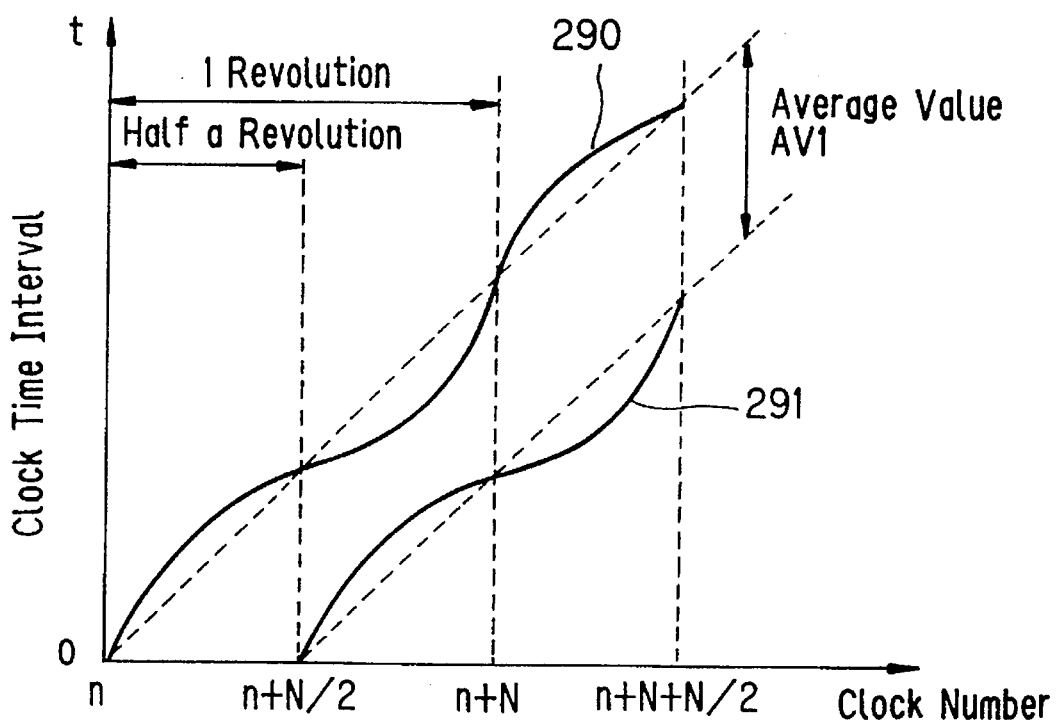
FIG. 12 is a graph illustrating the clock mark reproduction signal time interval 290 measured by the time interval measurement section 70A and stored in the memory 82A, the time interval measured value 291 subtracted by the subtracter 85A, and the average value AV1 output by the divider 88A, in the second detailed construction of an eccentricity magnitude measurement section shown in FIG. 10.

FIG. 12 shows the clock mark reproduction signal time interval 290 measured by the time interval measurement section 70A and stored in the memory 82A, the time interval measured value 291 subtracted by the subtracter 85A, and the average value AV1 outputted by the divider 88A, plotted against clock number, for the measurement method illustrated in FIG. 10.

Figure 13:
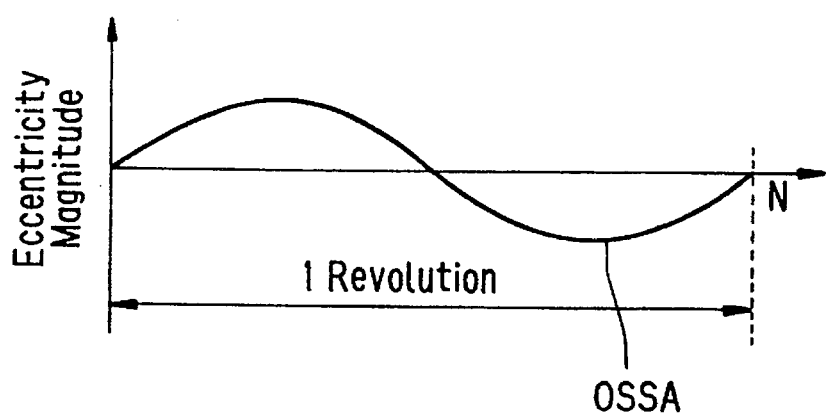
FIG. 13 is a view illustrating an example of the eccentricity magnitude stored in association with the disc angle in the memory 26MA of the second detailed construction of an eccentricity magnitude measurement section shown in FIG. 10.

FIG. 13 shows an example of the eccentricity magnitude stored in association with the disc angle in the memory 26MA of FIG. 10, i.e. the distance, due to eccentricity, of the circular data tracks from the head locus 503 (see FIG. 5); this data string OSSA stored in the memory 26MA can be used as a table of eccentricity distance with disc angular position for eccentricity correction.

(6) Sixth Eccentricity Magnitude Measurement Method

Figure 14:
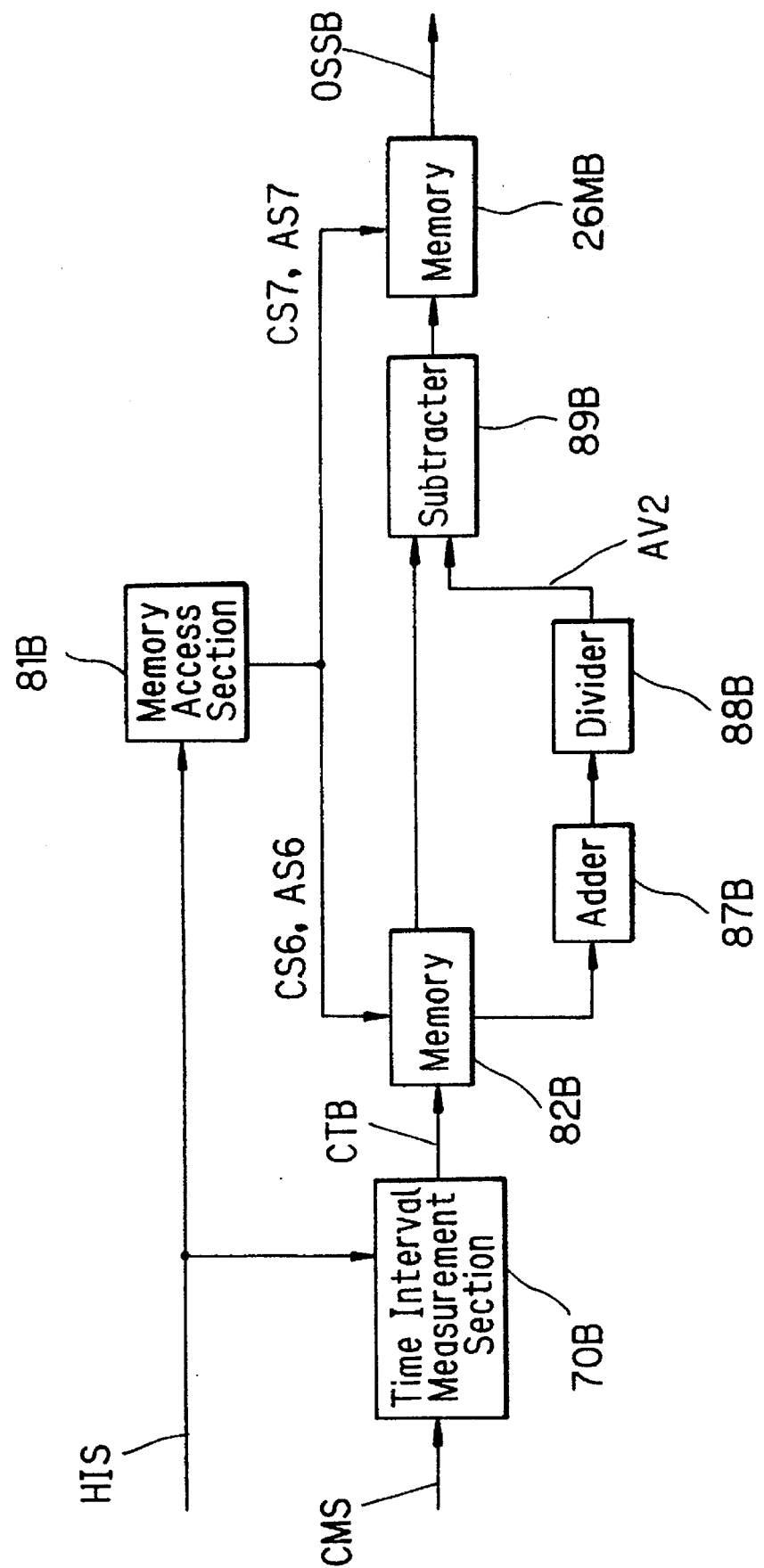
FIG. 14 is a block diagram illustrating a third detailed construction of an eccentricity magnitude measurement section according to the present invention.

FIG. 14 illustrates a construction for practicing a sixth eccentricity measurement method of this invention.

A time interval measurement section 70B uses a home index signal HIS to measure the time interval from the $(n+m)^{th}$ clock mark reproduction signal CMS reproduced from the disc to the $(n+m+N/2)^{th}$ clock mark reproduced signal CMS reproduced from the disc for all integers m from m=0 to m=(N−1). The time interval measured values measured by the time interval measurement section 70B are stored in order in a memory 82B according to a control signal CS6 and an address signal AS6 output by a memory access section 81B based on the home index signal HIS.

The time interval measured values stored in the memory 82B are read out according to the control signal CS6 and the address signal AS6 output by the memory access section 81B based on the home index signal HIS. The time interval measured values read out from the memory 82B are summed in an adder 87B into sums of N consecutive values, and a divider 88B divides the summation results obtained by the adder 87B by N and outputs average values AV2.

A subtracter 89B subtracts the average value AV2 from the $p^{th}$ subtraction result read out from the memory 82B for all integers p from p=1 to p=N. The subtraction results obtained by the subtracter 89B are stored in order in a memory 26MB according to a control signal CS7 and an address signal AS7 output by the memory access section 81B based on the home index signal HIS.

The subtraction results stored in the memory 26MB represent the eccentricity magnitude with angular position of the disc, and give the distance, due to eccentricity, of the circular data tracks from the head locus 503 (see FIG. 5); they are read out as eccentricity magnitudes OSSB according to the control signal CS7 and the address signal AS7 output by the memory access section 81B based on the home index signal HIS, and can be used as an eccentricity distance table for performing eccentricity correction. With the measurement method shown in FIG. 14, the number of counters for time interval measurement can be reduced further than is possible with the method shown in FIG. 10.

Figure 15:
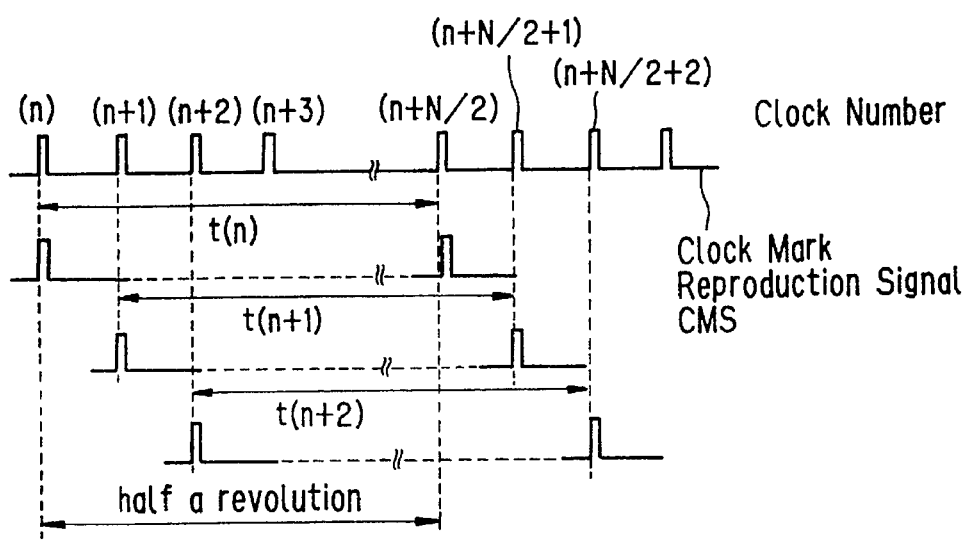
FIG. 15 is a view illustrating the relationship between the clock mark reproduction signals and the measured time intervals in the third detailed construction of an eccentricity magnitude measurement section according to the present invention shown in FIG. 14.

FIG. 15 shows the relationship between the clock mark reproduction signals and the measured time intervals in the sixth measurement method illustrated in FIG. 14.

In FIG. 15, the time interval between the $n^{th}$ clock mark reproduction signal CMS and the $(n+N/2)^{th}$ clock mark reproduction signal CMS is t(n).

Figure 16:
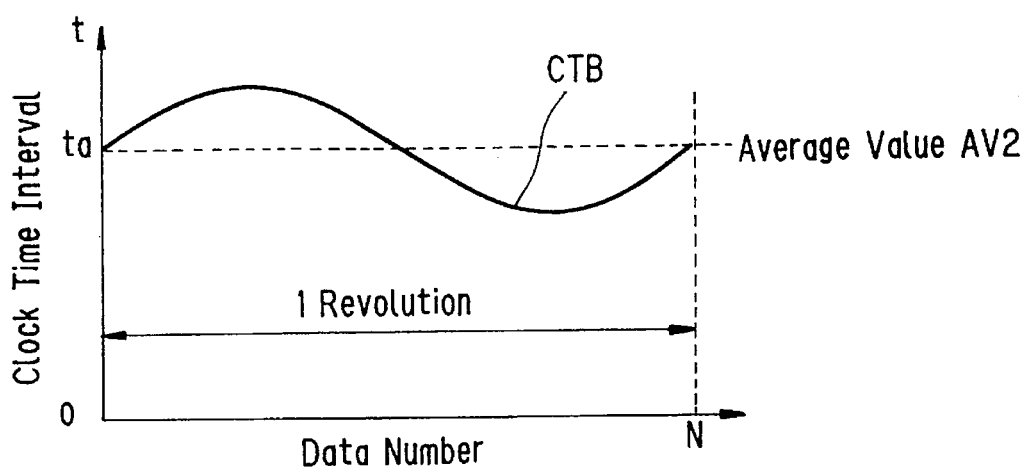
FIG. 16 is a graph illustrating the time interval measured value CTB measured by the time interval measurement section 70B and stored in the memory 82B, and the average value AV2 output by the divider 88B, in the third detailed construction of an eccentricity magnitude measurement section according to the present invention shown in FIG. 14.

FIG. 16 shows the clock mark reproduction signal time interval measured value CTB, measured by the time interval measurement section 70B and stored in the memory 82B, and the average value AV2 output by the divider 88B, plotted against data number, for the measurement method illustrated in FIG. 14.

Figure 17:
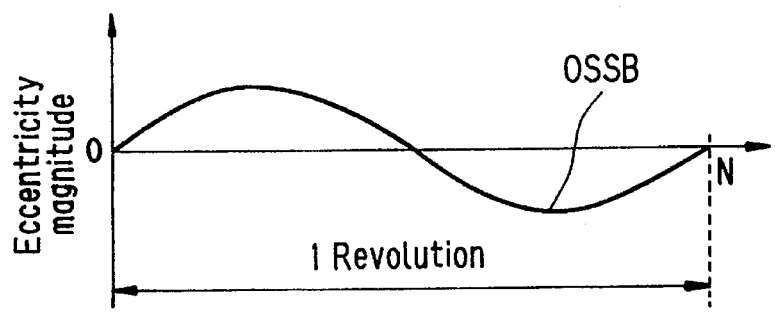
FIG. 17 is a view illustrating an example of the eccentricity magnitude stored in association with the disc angle in the memory 26MB of the third detailed construction of an eccentricity magnitude measurement section shown in FIG. 14.

FIG. 17 shows an example of an eccentricity magnitude/ disc angle curve OSSB stored in the memory 26MB of the sixth measurement method illustrated in FIG. 14, i.e. the distance, due to eccentricity, of the circular data tracks from the head locus 503 (see FIG. 5); this data string OSSB stored in the memory 26MB can be used as a table of eccentricity distance against disc angular position for eccentricity correction.

(7) Seventh Eccentricity Magnitude Measurement Method

Figure 18:
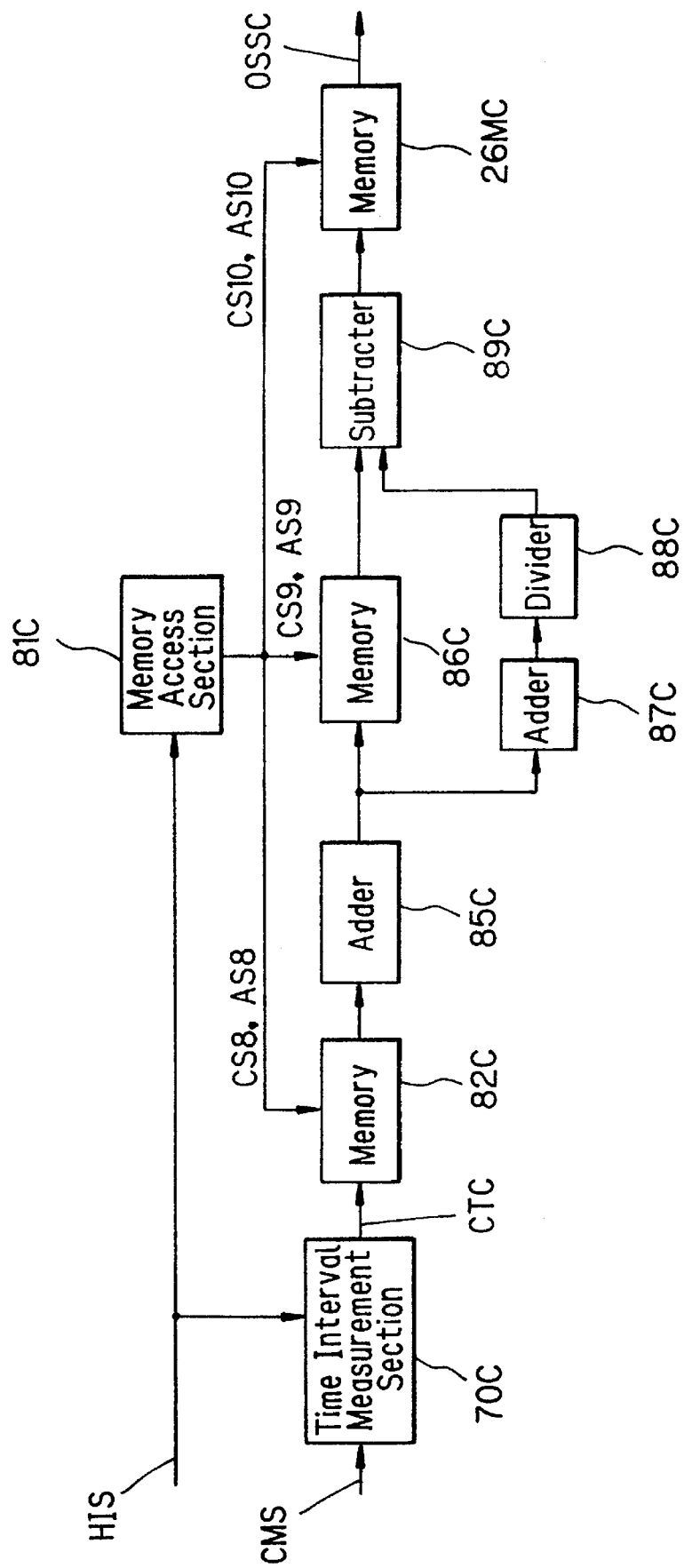
FIG. 18 is a block diagram illustrating a fourth detailed construction of an eccentricity magnitude measurement section according to the present invention.

FIG. 18 illustrates a construction for practicing a seventh eccentricity magnitude measurement method.

A time interval measurement section 70C uses a home index signal HIS to measure the time interval from the $(n+m)^{th}$ (where n is an integer from 1 to N) clock mark reproduction signal CMS reproduced from the disc to the $(n+m+1)^{th}$ clock mark reproduction signal CMS reproduced from the disc for all integers m from m=0 to m=(N+N/2−1). The time interval measured values measured by the time interval measurement section 70C are stored in order in a memory 82C according to a control signal CS8 and an address signal AS8 output by a memory access section 81C based on the home index signal HIS.

The time interval measured values stored in the memory 82C are read out according to the control signal CS8 and the address signal AS8 output by the memory access section 81C based on the home index signal HIS. An adder 85C sums the N/2 values from the $p^{th}$ time interval measured value read out to the $(p+N/2)^{th}$ time interval measured value read out, for all integers p from p=1 to p=N. The summation results obtained by the adder 85C are stored in a memory 86C according to a control signal CS9 and an address signal AS9 output by the memory access section 81C based on the home index signal HIS.

The summation results obtained by the adder 85C are also summed in an adder 87C into sums of the values of N results, and a divider 88C divides the summation results obtained by the adder 87C by N and outputs average values AV3.

The summation results stored in the memory 86C are read out in order according to the control signal CS9 and the address signal AS9 output by the memory access section 81C based on the home index signal HIS. A subtracter 89C subtracts the average value AV3 from the $k^{th}$ subtraction result read out for all integers k from k=1 to k=N. The subtraction results obtained by the subtracter 89C are stored in order in a memory 26MC according to a control signal CS10 and an address signal AS10 output by the memory access section 81C based on the home index signal HIS.

The subtraction results stored in the memory 26MC represent the eccentricity magnitude with angular position of the disc, and give the distance, due to eccentricity, of the circular data tracks from the head locus 503 (see FIG. 5); they are read out as eccentricity magnitudes OSSC according to the control signal CS10 and the address signal AS10 output by the memory access section 81C based on the home index signal HIS, and can be used as an eccentricity distance table for performing eccentricity correction. With the measurement method shown in FIG. 18, noise can be reduced further than is possible with the method shown in FIG. 6, and the number of counters for time interval measurement can be reduced further than is possible with the method shown in FIG. 14.

Figure 19:
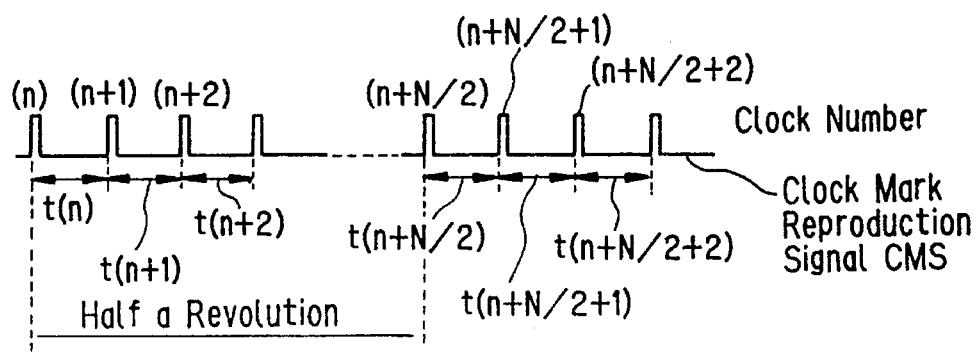
FIG. 19 is a view illustrating the relationship between the clock mark reproduction signals and the measured time intervals in the fourth detailed construction of an eccentricity magnitude measurement section according to the present invention shown in FIG. 18.

FIG. 19 shows the relationship between the clock mark reproduction signals and the measured time intervals CTC in the seventh measurement method illustrated in FIG. 18. In FIG. 19, the time interval between the $n^{th}$ clock mark reproduction signal CMS and the $(n+1)^{th}$ clock mark reproduction signal CMS is t(n).

Figure 20:
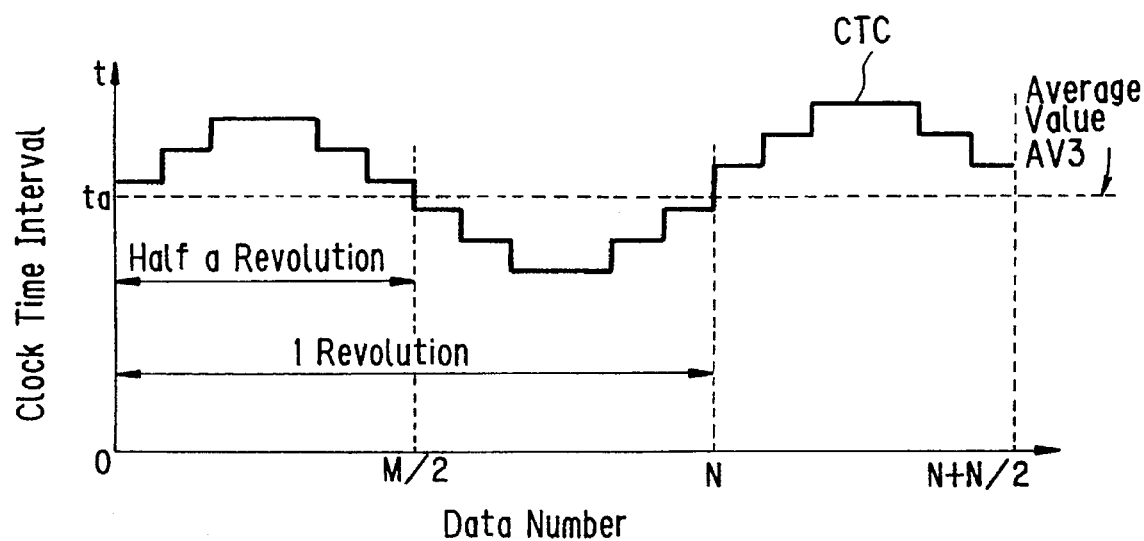
FIG. 20 is a graph illustrating the clock mark reproduction signal time interval CTC measured by the time interval measurement section 70C and stored in the memory 82C, and the average value AV3 outputted by the divider 88C, in the fourth detailed construction of an eccentricity magnitude measurement section according to the present invention shown in FIG. 18.

FIG. 20 shows the clock mark replay signal time interval measured value CTC, measured by the time interval measurement section 70C and stored in the memory 82C, and the average value AV3 output by the divider 88C, in the measurement method illustrated in FIG. 18. The time interval measurement section 70C measures in the smallest time units of the measuring means. When the smallest time units are coarse with respect to the eccentricity magnitude, the measured time interval data string CTC is stepped with respect to the angular position of the disc. If the number N/2 of time interval data string CTC values measured in step form summed in the adder 85C is sufficiently large, the eccentricity information obtained can be smoothly reproduced with respect to the angular position of the disc.

Figure 21:
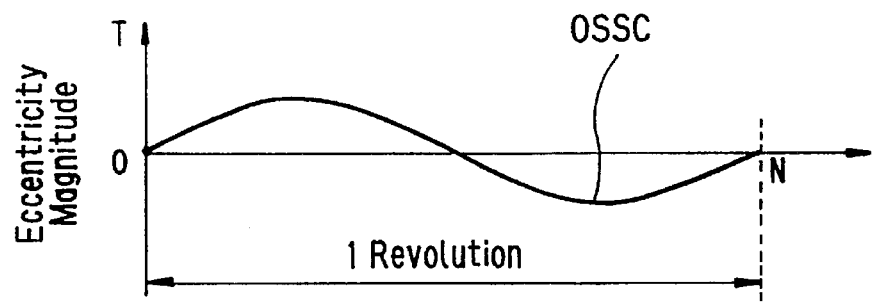
FIG. 21 is a view illustrating an example of the eccentricity magnitude stored in association with the disc angle in the memory 26MC of the fourth detailed construction of an eccentricity magnitude measurement section shown in FIG. 18.

FIG. 21 shows an example of an eccentricity magnitude/ disc angle curve OSSC stored in the memory 26MC of the measurement method illustrated in FIG. 18, i.e. the distance, due to eccentricity, of the circular data tracks from the head locus 503 (see FIG. 5); this data string OSSC stored in the memory 26MC can be used as a table of eccentricity distance with disc angular position for eccentricity correction.

Figure 22:
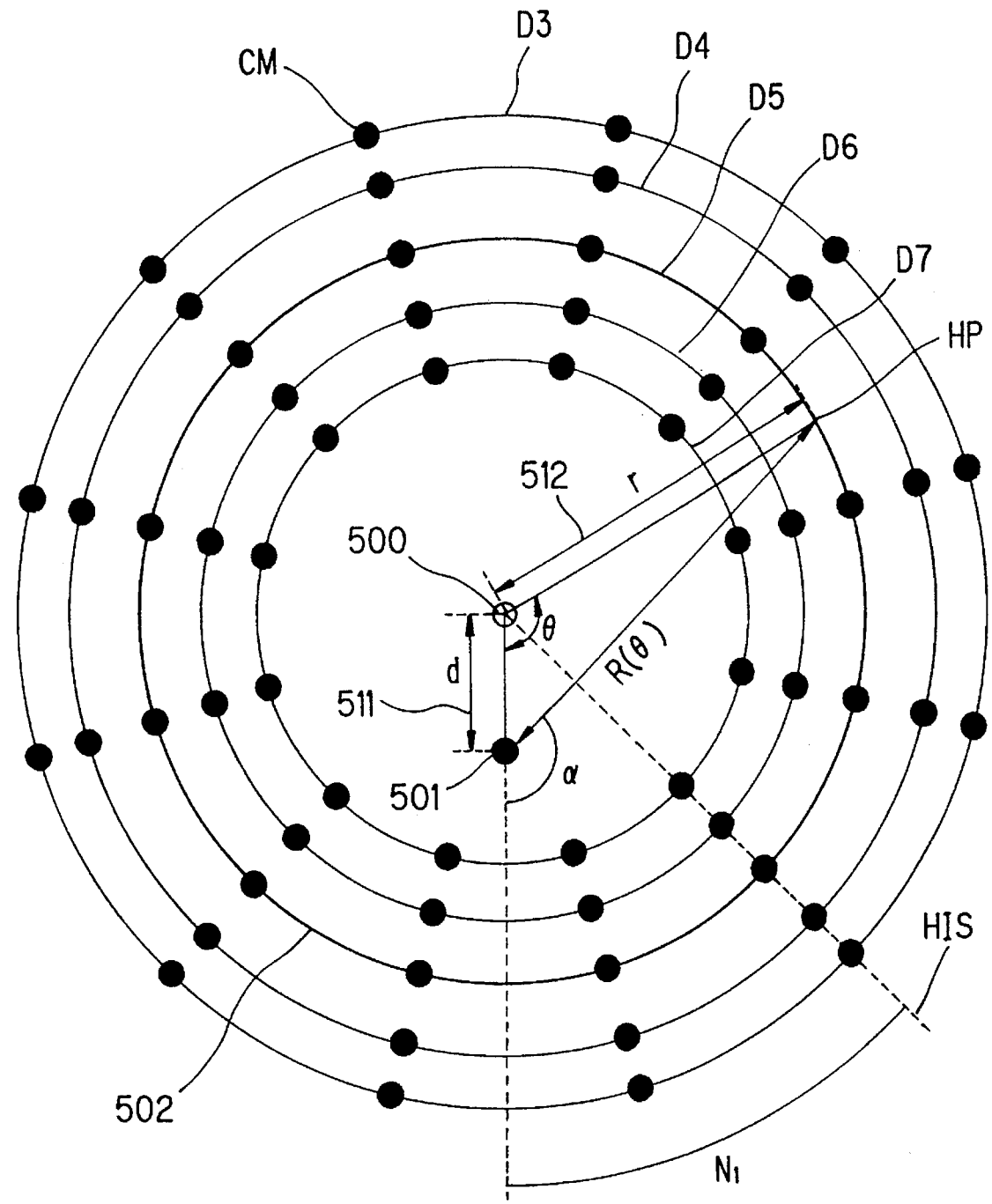
FIG. 22 is a view illustrating N clock marks recorded at physically uniform intervals around each of the circular data tracks in a magnetic disc, and showing the change in the radius, with respect to the center of rotation of the spindle, of the recording and reproduction head, i.e. the signal readout head, as it runs around the same single track, due to eccentricity between the center of the circular data tracks and the center of rotation of the spindle.

FIG. 22 shows N clock marks recorded at physically uniform intervals around each of the circular data tracks in a magnetic disc, and shows the change in the radius of the recording and reproduction head, i.e. the signal readout head, as it runs around one track, due to the eccentricity between the center of the circular data tracks and the center of rotation of the spindle. In FIG. 22, features which are the same as features shown in FIG. 5 have been given the same reference numbers as they have in FIG. 5. When an eccentricity 511 occurs when the disc is chucked onto the rotating shaft of the spindle motor 501, the radius from the center of rotation of the disc of the signal readout head as it runs around the same single track (for example the circular track D5=track 502) is not constant.

Here, the eccentricity distance 511 between the center 500 of the data tracks and the rotating shaft 501 of the spindle motor will be written d, the radial distance 512 from the center 500 of the data tracks will be written r, the angle between the straight line connecting the head traveling position HP to the center 500 of the data tracks and the straight line connecting the center 500 of the data tracks and the center of rotation 501 of the spindle will be written θ, and the angular velocity of the spindle will be written ω.

The distance R(θ) from the center of rotation 501 of the spindle to the head traveling position is given by Equation 6:

$$R(\theta)=(r^2+d^2-2rd*cos(\theta))^{1/2} \qquad \text{Equation 6}$$

And, if the angle between the line connecting the center of rotation 501 of the spindle to the traveling position HP of the head and the line connecting the center 500 of the data tracks to the center of rotation 501 of the spindle is called α, and if the number of clock marks from the clock mark signal CM on the extension of the line connecting the center 500 of the data tracks and the center of rotation 501 of the spindle to the home index signal HIS is denoted N1, and if the clock mark reproduction signals CMS are numbered n from the home index signal HIS, because r is much greater than d and the angle θ is therefore approximately equal to α, the angle θ is given by Equation 7:

$$\theta=\omega(n-N1)/N \qquad \text{Equation 7}$$

Substituting Equation 7 into Equation 6, and writing the head track traveling velocity as v(n), $$v(n)=(r^2+d^2-2rd*cos(\omega(n-N1)/N))^{1/2}\omega \qquad \text{Equation 8}$$

is obtained. Because the distance between clock marks on the same track is fixed and is r*2π/N, the time T(n) taken for the head to travel between clock marks is given by Equation 9:

$$T(n)=(r*2\pi/N)/v(n)=2\pi r/(N\omega)/$$
$$(r^2+d^2-2rd*cos(\omega(n-N1)/N))^{1/2} \qquad \text{Equation 9}$$

From this Equation 9, the time taken for the head to travel between clock marks is greatest when n=N1 and is least when n=N1+N/2.

Here, the number N of clock marks per circular data track and the angular velocity ω of the spindle are design values and are therefore known. Therefore, for any desired head traveling radius r, using the two values the eccentricity distance d and the clock number N1 from the home index signal HIS recorded in the tracks to the greatest value of the time taken by the head to travel between clock marks, the eccentricity correction magnitudes all the way round the disc can be obtained from Equation 9.

In FIG. 5, with the head traveling radius 510 fixed at a particular value R, when the head crosses the data tracks from D3 to D7 and the clock marks are reproduced, writing the eccentricity distance 511 as d and the head traveling velocity as Rω, the shortest measured time interval between clock mark reproductions t13 is given by Equation 10:

$$t13=(R-d)*2\pi/(N*R\omega) \qquad \text{Equation 10}$$

Similarly, the longest measured time interval between clock mark reproductions t14 is given by Equation 11:

$$t14=(R+d)*2\pi/(N*R\omega) \qquad \text{Equation 11}$$

From Equations 10 and 11, the greatest clock mark reproduction time interval amplitude is given by Equation 12:

$$t14-t13=2d*2\pi/(N*R\omega) \qquad \text{Equation 12}$$

Rearranging Equation 12 gives Equation 13:

$$d=(t14-t13)*N*R\omega/(4\pi) \qquad \text{Equation 13}$$

Thus, from the maximum and minimum values of the clock mark reproduction time interval, and by measuring the head traveling radius R at the time, using Equation 13, the eccentricity distance d can be obtained.

(8) Eighth Eccentricity Magnitude Measurement Method

Figure 23:
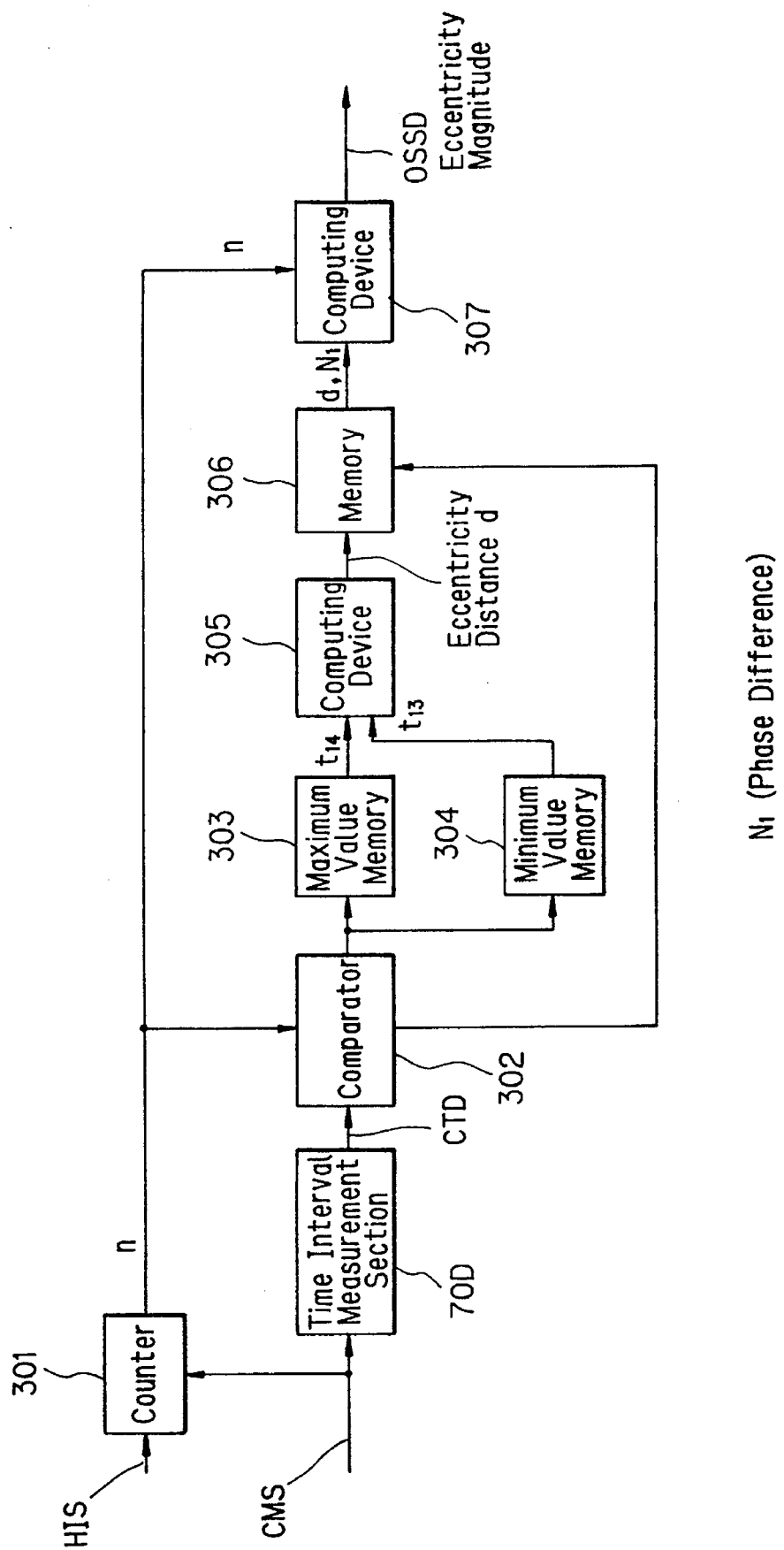
FIG. 23 is a block diagram illustrating a fifth detailed construction of an eccentricity magnitude measurement section according to the present invention.

FIG. 23 shows a construction for practicing an eighth eccentricity magnitude measurement method in which the eccentricity magnitude along the time axis is measured.

A time interval measuring section 70D measures the time intervals between the clock mark reproduction signals CMS reproduced from the disc, and outputs time interval measured values CTD. A counter 301 uses a home index signal HIS to count the number of clock mark reproduction signals CMS and outputs the count value n.

A comparator 302 extracts the maximum value t14 from the time interval measured values CTD and holds it in a maximum value memory 303, and also extracts the minimum value t13 and holds it in a minimum value memory 304. The comparator 302 also stores the count value N1 for the time at which the maximum value t14 was sampled in a memory 306.

A computing device 305 uses the maximum value t14 stored in the memory 303, the minimum value t13 stored in the memory 304, the predetermined number of clock marks N and disc angular velocity $â_r$, and the head traveling radius R, and performs the computation of Equation 13, and stores the computed result for the eccentricity distance d in the memory 306.

A computing device 307 uses the count value N1 for the time at which the maximum value t14 was sampled, i.e. the count value indicating the phase difference from the home index signal, stored in the memory 306, and the eccentricity distance d, and the count value n of the clock marks from the home index signal, and performs the computation of Equation 9. The computation results for one circuit of the disc output by the computing device 307 can be used as eccentricity correction magnitudes with disc angular position.

[2] Second Preferred Embodiment

Figure 24:
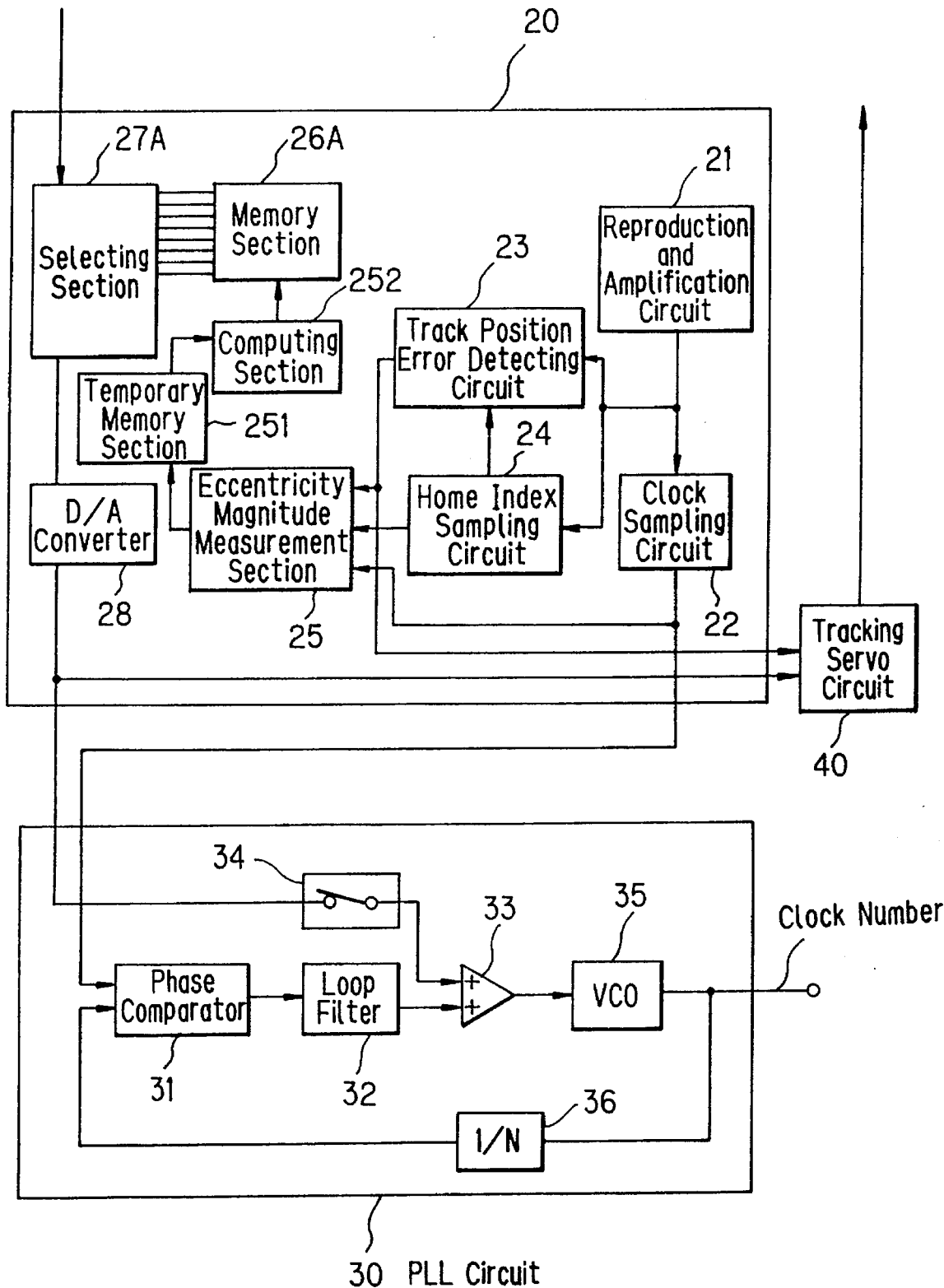
FIG. 24 is a block diagram illustrating a second embodiment of a disc device according to the present invention.

FIG. 24 shows a second preferred embodiment of the disc device of the present invention.

Whereas in the first embodiment shown in FIG. 2 the dislocation (eccentricity magnitude) of the track itself for each position in the rotation of the disk is used as the content stored in the memory section 26, in the second embodiment shown in FIG. 24 the dislocation of the track itself is stored temporarily in a temporary memory section 251 and then a value obtained by a computation equivalent to that carried out by the feed forward compensator 29 in FIG. 2 is performed on it by the computing section 252 and the resulting magnitude is stored in the memory section 26A. Accordingly, the value stored in the memory section 26A is a velocity corresponding to the eccentricity.

This arrangement has the merit that the feed forward compensator 29 in FIG. 2 can be omitted. That is, while the feed forward compensator 29 in FIG. 2, i.e. the filter, needs to be constructed using high speed devices to carry out a real-time operation, since the measurement of eccentricity is carried out about once a day, a low cost general purpose processor may be used if the equivalent computation with the feed forward compensator 29 in the embodiment shown in FIG. 2 is implemented beforehand as in the second embodiment shown in FIG. 24. Furthermore, there is an additional merit that a digital operation which is difficult with corresponding analog processing may be realized.

In the embodiment shown in FIG. 24, a memory content selecting section 27A selectively takes out values (i.e. velocities) corresponding to the eccentricity magnitudes of a plurality of disk faces which are stored in the memory section 26A, based on commands from the controller 60.

Because the second embodiment shown in FIG. 24 is constructed as described above, measured eccentricity results obtained in the same manner as in the first embodiment shown in FIG. 2 are adjusted to the required amplitude and phase characteristics by the computing section 252 and then stored in the memory section 26A. This eccentricity measuring operation is repetitively carried out separately for each face of the plurality of disks at a suitable time, for example after a power switch is turned on. This operation is carried out eight times in total since there are eight faces, using the heads provided corresponding to each face. Accordingly, eight sets of eccentricity magnitudes are stored in the memory section 26A.

Now a case when the controller 60 selects the disk 1B (see FIG. 2) for example will be explained. At this time, the selecting section 27A outputs eccentricity data detected by the head 3B from among the information stored in the memory section 26A in synchronization with the rotation of the disk 1B. The eccentricity data output is stored data in each memory address which corresponds to a coordinate of an angular position, and corresponds to a quantity for compensating a phase of an eccentricity at such coordinate as shown in FIG. 26 for example.

Accordingly, if this is applied to the VCO 35 via the analog adder 33 after being converted into an analog voltage by the D/A converter 28, the VCO 35 correctly cancels out the delay of advancement of the clock caused by the eccentricity of the disk and can generate pulses whose phase is very close to the clock reproduced from the disk.

In the second embodiment shown in FIG. 24, although the result of the computation performed on the eccentricity by the computing section 252 is stored in the memory section 26A and a computation result that corresponds to a disk face to be processed is read out, it is possible instead to store the eccentricity magnitude itself and to read the eccentricity magnitude that corresponds to the disk face to be processed.

Figure 25:
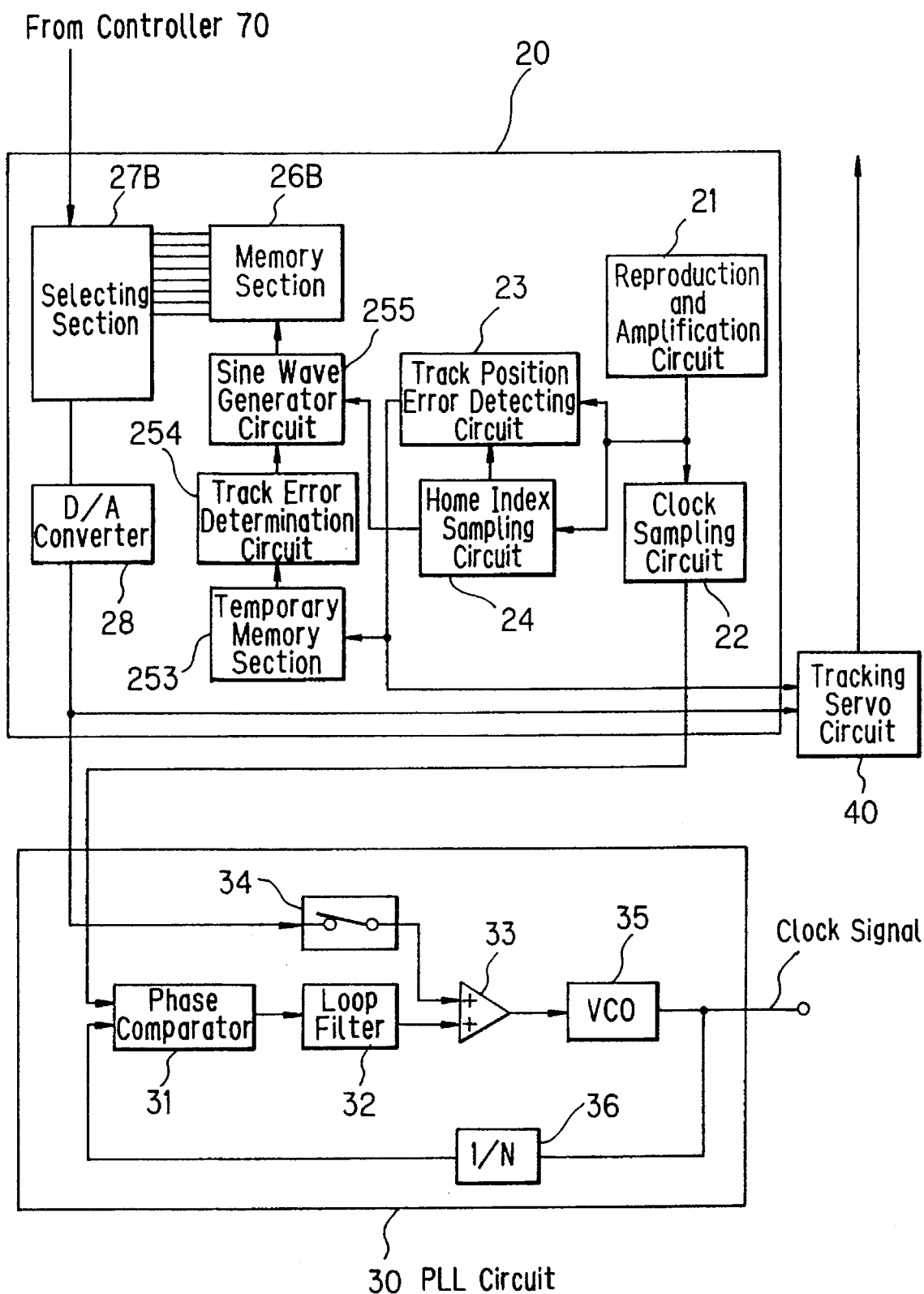
FIG. 25 is a block diagram illustrating a modified version of the second embodiment of the disc device of the present invention.
Figure 26:
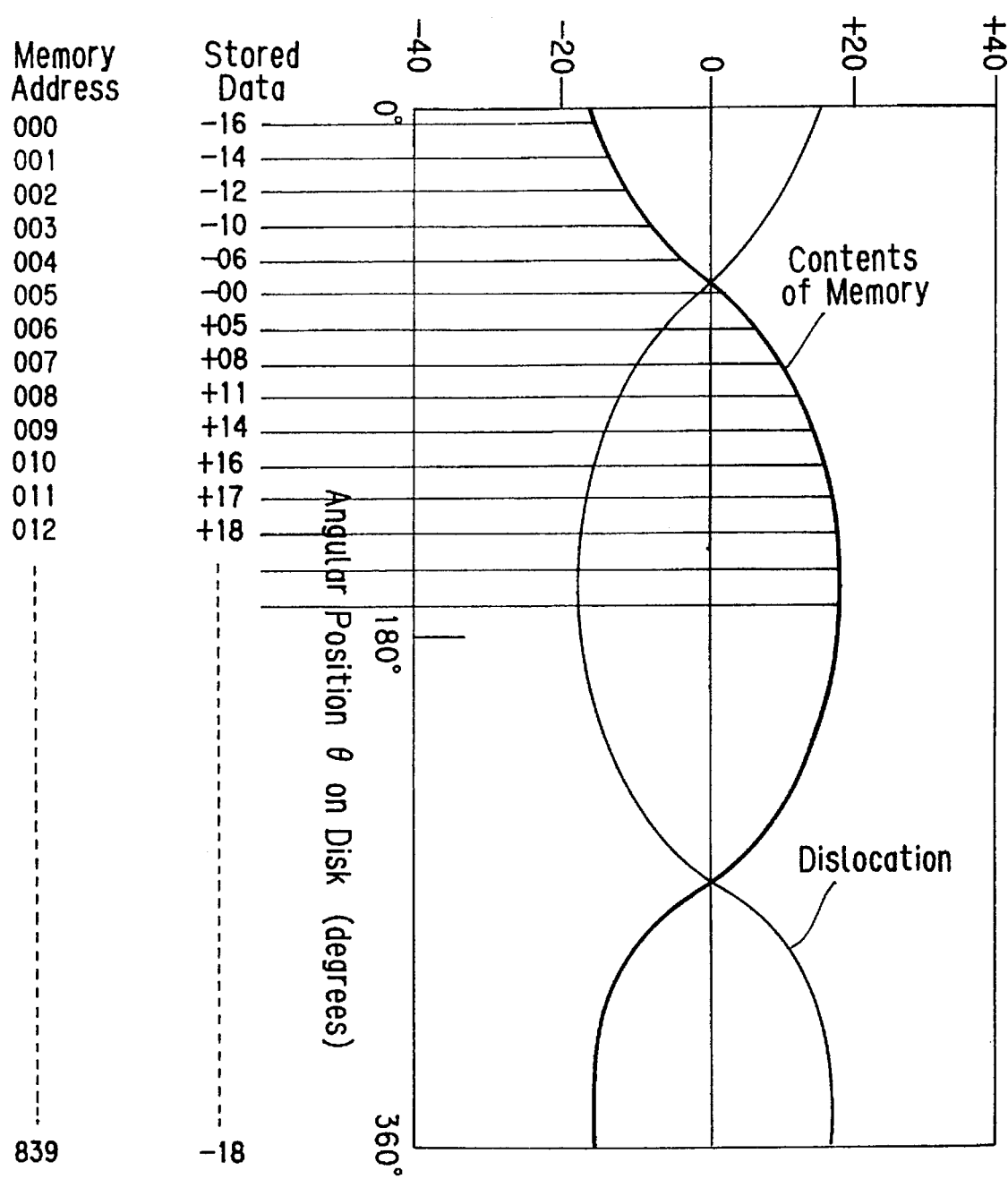
FIG. 26 is an explanatory drawing illustrating the stored contents of the memory section 26A of the second embodiment shown in FIG. 24.

This eccentricity magnitude generally corresponds to the initial phase of a sine wave function after shifting as shown in FIG. 26. Therefore, it is possible to find the eccentricity by generating a sine function in the computing section 252 of FIG. 25 and by storing it in the memory section 26A, for example, without actually measuring it.

In this method, two parameters, phase and amplitude, of the sine wave need to be determined. One example of this method will be shown below.

First, from a sine wave generating circuit 255, a virtual data set whose initial phase is 0° and whose amplitude is equivalent to 10 tracks is stored in the memory section 26B. Then, based on that, a virtual feed forward servo is implemented using the tracking servo circuit 40.

Also, the track traverse (traverse due to eccentricity) is counted by the track position error detecting circuit 23 and stored in the temporary memory section 253. Then, in the sine wave generating circuit 255, a sine wave function slightly shifted from the preceding one is generated, and, using the tracking servo circuit 40, feed forward servo is performed. Then, the track error determination circuit 254 compares the previous number of times of track traverse, memory in the temporary store section 253, and the current number of track traverse of this time, and determines whether the error is being improved or not.

Based on this determination result, the initial phase for the next run is determined. This series of operations is repeated N times, and when the value of the track traverse reaches a minimum value the initial phase is defined. After that, the amplitude is also changed and M runs are carried out, and at the point when the track traverse reaches a minimum value the content in the memory section 26B is defined.

[3] Third Preferred Embodiment

Figure 27:
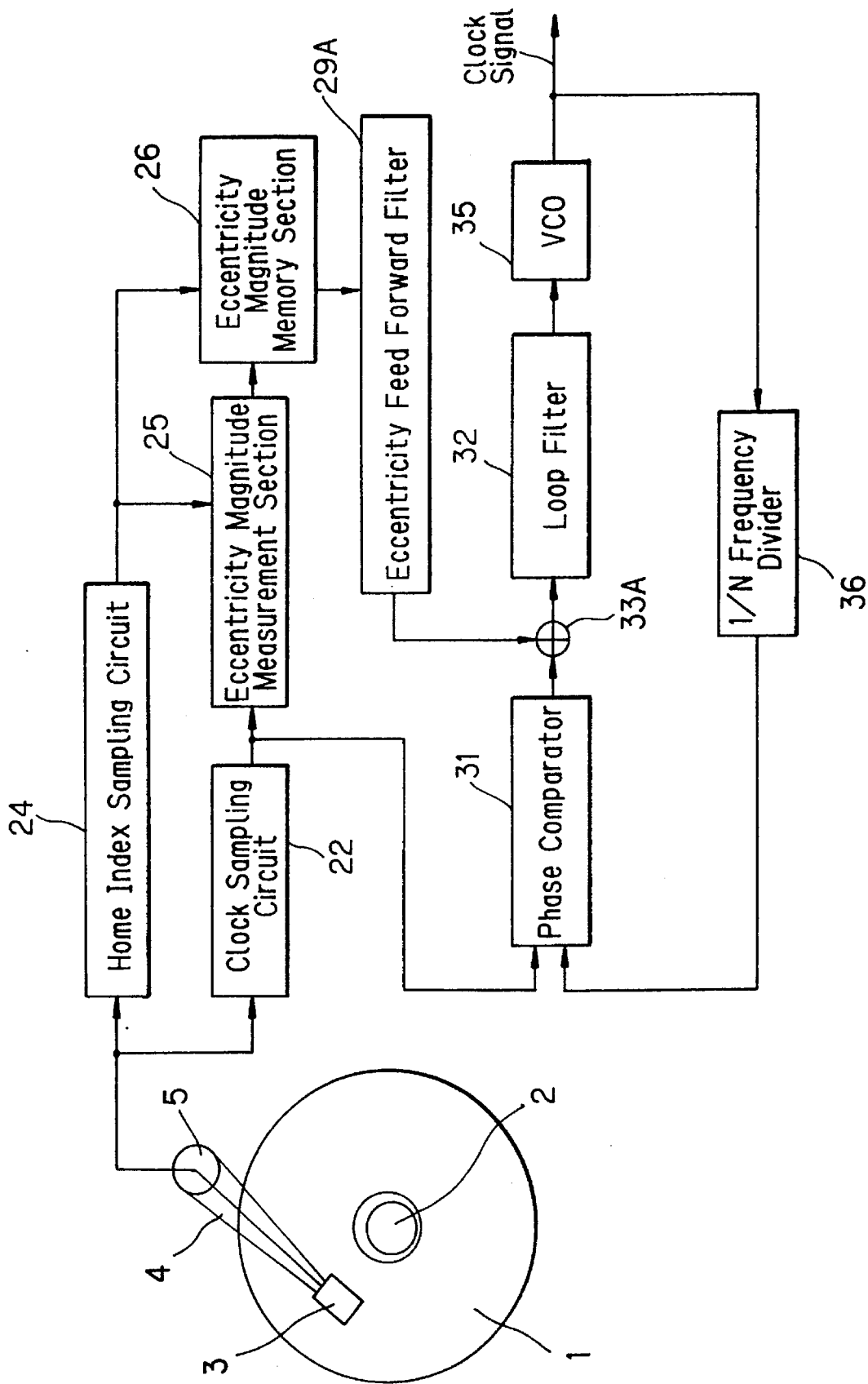
FIG. 27 is a block diagram showing a third embodiment of a disc device according to the present invention.

FIG. 27 shows a third embodiment of the disc device of the present invention. In FIG. 27, a magnetic disk 1 corresponds to one of the four magnetic disks 1A, 1B, 1C and 1D shown in FIG. 2, a spindle motor 2 corresponds to the spindle motor 2 in FIG. 2, a magnetic head 3 corresponds to one of the magnetic heads 3A, 3B, 3C and 3D in FIG. 2, and an arm 4 corresponds to one of the four arms 4A, 4B, 4C and 4D in FIG. 2. A VCM 5, a memory section 26, a phase comparator 31, a loop filter 32, a VCO 35 and a 1/N frequency divider 36 also correspond to those in FIG. 2.

An eccentricity feed forwarding filter 29A converts an eccentricity magnitude read out of the memory section 26 into a feed forward compensated value, i.e. a positional signal, and supplies it to one input terminal of an analog adder 33A. The adder 33A adds the signal from the filter 29A to the signal from the phase comparator 31 and supplies the result to the loop filter 32.

It is noted here that although the eccentricity magnitude is memorized and is read out to convert into the feed forward compensated value by the filter 29A in the third embodiment shown in FIG. 27, it is possible to memorize a digital value obtained by converting the eccentricity magnitude into a feed forward compensated value beforehand.

With the several embodiments of the present invention described above, it is possible to reproduce clock signals that are correctly synchronized with the clock marks marked on the disk and a very good result can be obtained if this clock is used in detecting track position error signals and in decoding data codes. Furthermore, the eccentricity frequency range gain may be increased without expanding the band of the clock reproducing loop.

[4] Fourth Preferred Embodiment

Figure 28:
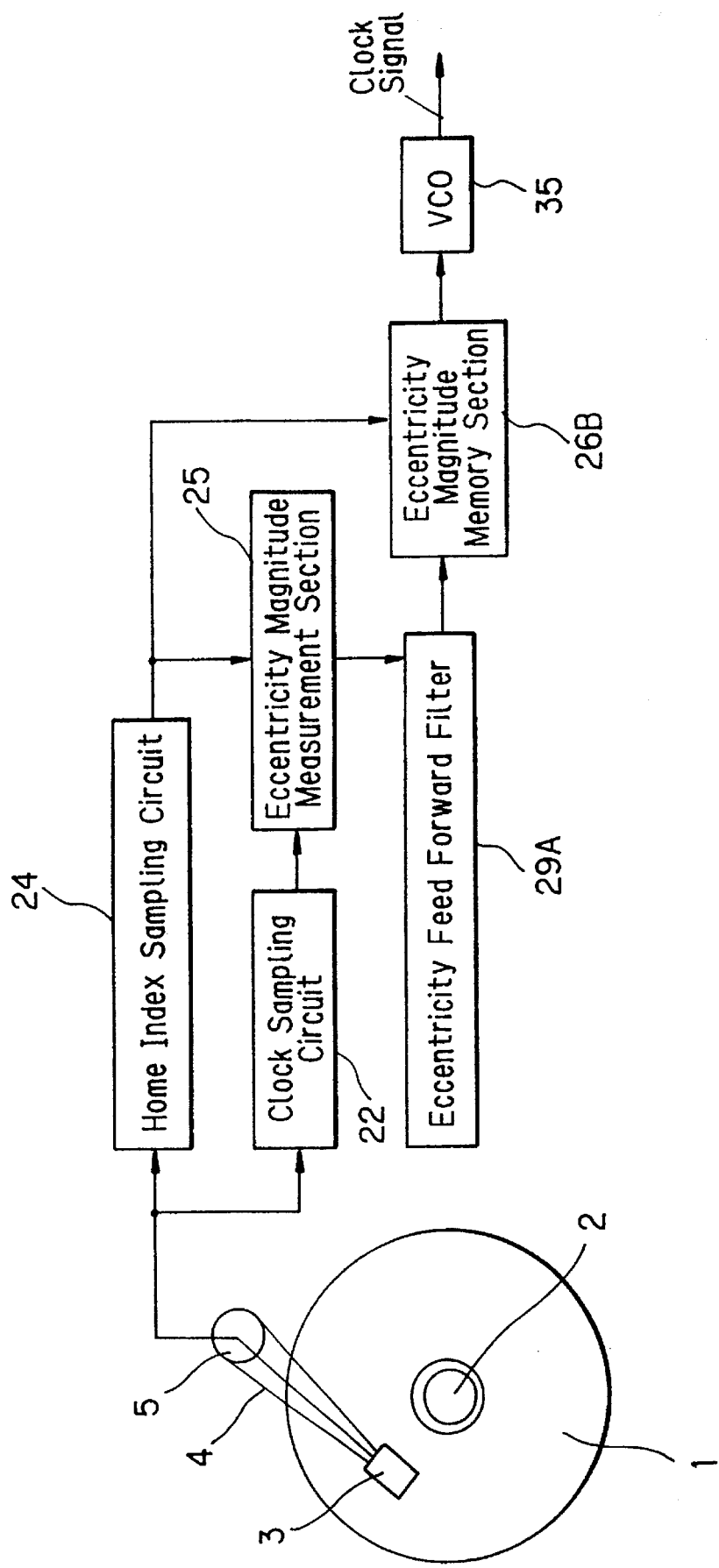
FIG. 28 is a block diagram showing a fourth embodiment of a disc device according to the present invention.

FIG. 28 shows a fourth embodiment of the disc device of the present invention.

This embodiment is suited for a case when the phase needs not be locked so accurately, and the phase control loop is omitted. An eccentricity magnitude measured by the track eccentricity magnitude measurement section 25 is converted into a feed forward compensated value by the eccentricity feed forwarding filter 29A (a digital filter in this case) and is stored in the eccentricity magnitude memory section 26B. The eccentricity magnitude memorized in the memory section 26B is read out according to a home index signal output from the home index sampling circuit 24 and is supplied to the VCO 35. The VCO 35 changes the phase or frequency of the output clock signal according to the eccentricity magnitude supplied to it.

The first through fourth embodiments described above correct the phase fluctuation of the reproduced clock signal caused by the offset between the center of rotation of the spindle and that of the data track circle using the dislocation of a specific track from an ideal track. Because of this, there have been problems in generating accurate clock signals, as follows:

(1) When a disk on which data tracks are formed beforehand is chucked on the spindle, the frequency fluctuation of the reproduced clock signal with respect to the fluctuation of the head traveling track radial position (fluctuation of the distance from the center of rotation of the spindle to the track where the head is positioned) caused by the offset between the center of the data tracks and the center of rotation becomes greater toward the inner periphery of the disk.

(2) A phase error is generated in the eccentricity correcting signal corresponding to the fluctuation of the head traveling track radius because the phase difference between the home index of the axis of rotation of the spindle and that on the data track circle of the disk is different for each track number, i.e. for each head traveling track radius, on the disk on which clock marks are disposed along the turning locus of the signal reading head supported by the turning arm.

In order to solve such problems, in the fifth and sixth embodiments of the present invention explained next, the external control voltage applied by the PLL circuit 30, i.e. the input voltage to the VCO 35, is changed corresponding to track numbers or the position of head traveling track radius. This allows adjustment of the amplitude and phase of the clock correcting value which change at the inner and outer peripheries of a specific track on the disk and the construction of a PLL system which follows up very accurately.

Figure 29:
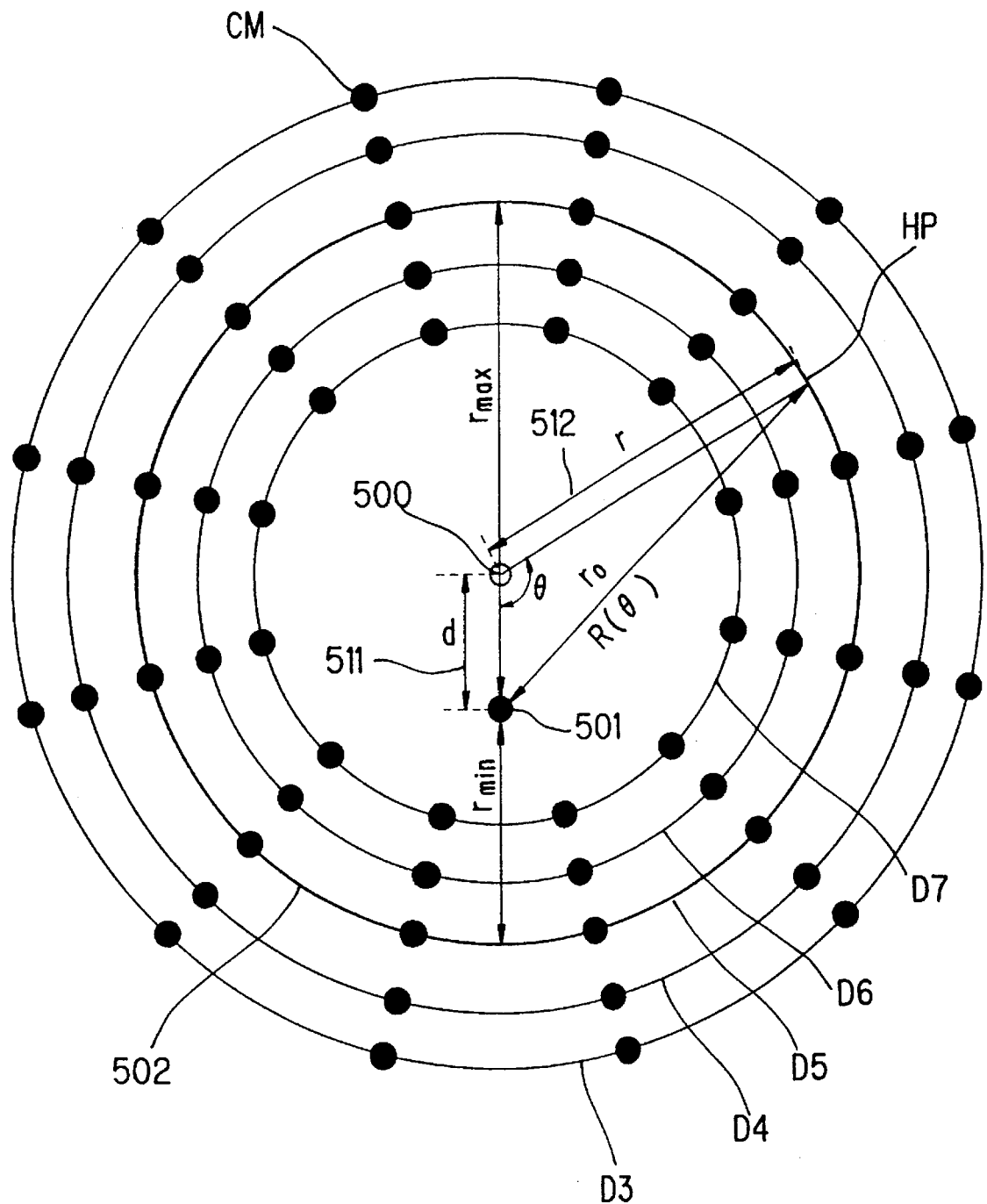
FIG. 29 is a view illustrating the relationship between the clock marks recorded at physically uniform circumferential intervals around the circular data tracks of a disc and the variation in the traveling radius of a signal readout headhead traveling over the same single track of the disc when the disc has been chucked with some eccentricity.

FIG. 29 shows clock marks recorded on the circular data tracks of a disk at equal intervals and changes of traveling radius on the same track of the signal reading head caused by the eccentricity between the center of the data tracks and the center of rotation of the spindle. In the figure, the reference numeral 500 denotes the center of the circular data tracks. Data tracks D3, D4, D5, D6 and D7 are formed concentrically around the center 500 and N (N: positive integer) clock marks CM are physically recorded on each of the data tracks at equal intervals.

When an eccentricity 511 is created when the disk on which the circular data tracks are formed as described above is chucked onto the rotating shaft of the spindle motor 501, the traveling radius from the center of the axis of rotation of the disk 500 of the signal reading head traveling on the same track changes as $r_{min}$, $r_0$ and $r_{max}$ as shown in FIG. 29.

When the eccentric distance 511 between the center of the data track 500 and the axis of rotation of the spindle motor 501 is d, the radial distance from the center of track of the circular data tracks is r, the angle formed between a line connecting the center of the data track 500 and a head traveling position HP and a line connecting the center of the data track 500 and the center of rotation of the spindle 501 is θ and the angular velocity of the rotation of the spindle is ω, the distance R(θ) from the center of rotation of the spindle 511 to the head traveling position HP is expressed as follows:

$$R(\theta)=(r^2+d^2-2rd*cos(\theta))^{1/2} \quad \text{Equation 15}$$

When the angle θ above is assumed to satisfy a condition that "r is much greater than d" in time t, it is expressed as follows:

$$\theta=\pi-\omega t \quad \text{Equation 16}$$

The track traveling velocity v(t) of the head can be expressed by substituting Equation 16 for Equation 15 as follows:

$$v(t)=(r^2+d^2-2rd*cos(\theta))^{1/2}*\omega \quad \text{Equation 17}$$

Because the distance between the clock marks CM is $r*2\pi/N$ at equal intervals on the same track, the following expression is satisfied when the time for passing between the clock marks when the distance from the center of rotation of the spindle 501 to the data track is the farthest is t1 and a time for passing the clock marks when the distance is the closest is t2:

$$t1-t2=2\pi r/(\omega N)*2d/(r^2-d^2) \quad \text{Equation 18}$$

Equation 18 can be simplified by utilizing the condition that "r is much greater than d" as follows:

$$t1-t2=2\pi/(\omega N)*2d/r \quad \text{Equation 19}$$

The number of clock marks N on the circular data track and the angular velocity ω of the rotation of the spindle in Equation 19 are values known from the beginning as design values. Therefore, as seen from Equation 19, the amplitude of the time intervals of the clock mark reproduction signal is changed by the eccentric distance d as well as by the head traveling track radius r.

Accordingly, the amplitude of the time intervals of the clock mark reproduction signal for an arbitrary head traveling track radius r may be obtained by measuring and holding the eccentric distance d, by holding values of the $2\pi/(\omega N)*2/r$ portion when r changes in table form as multiplication coefficients and by multiplying the eccentric distance d by the multiplication coefficient.

Figure 30:
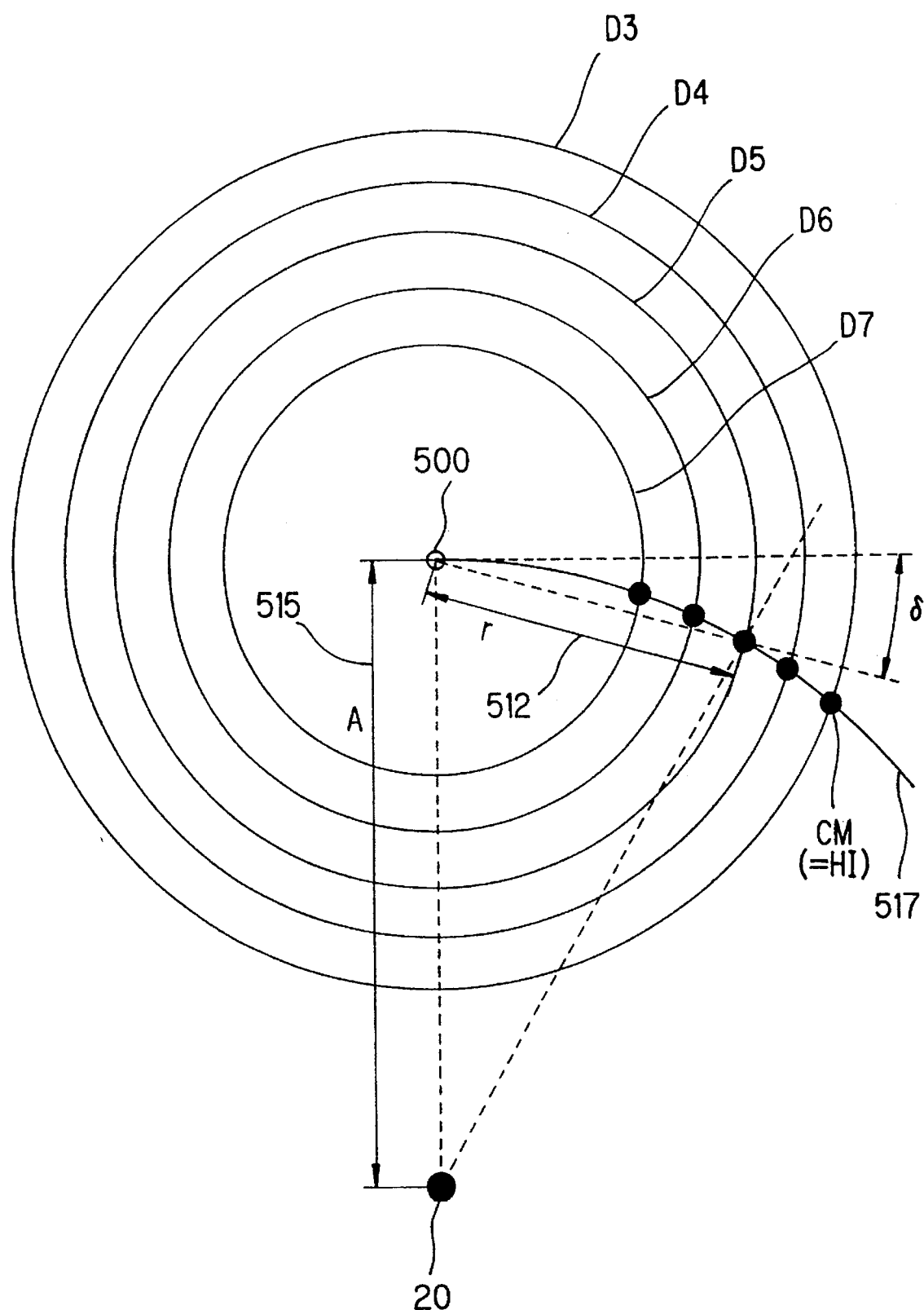
FIG. 30 is a view illustrating the relationship between clock marks recorded at physically uniform circumferential intervals around the circular data tracks of a disc, the home index signals, and the rotational radius locus of the arm to which the signal readout head is attached.

FIG. 30 shows the turning radial locus of the head mounting arm of the signal reading head and clock marks and home index marks disposed on the locus. In the figure, the reference numeral 500 denotes the center of the circular data tracks. Data tracks D3, D4, D5, D6 and D7 are formed concentrically around the center 500 and N clock marks CM are physically recorded on each of the data tracks at equal intervals. One home index mark HI is recorded on each circuit. These clock marks CM and home index marks HI are disposed on the turning radial locus 517 of the head mounting arm extending in the disk radial direction.

Here, when the turning radial distance 515 of the head mounting arm is indicated by A, the disk rotational radial distance 512, i.e. the head traveling track radius from the center of the track 500 (in FIG. 30, the center 500 and the axis of rotation of the spindle are assumed to coincide) to the track where the signal reading head is located (the data track D5 in FIG. 30) is indicated by r and the phase difference angle between the home index position of the axis of rotation of the spindle and the home index marks recorded on the disk data track is indicated by δ, δ may be expressed as follows:

$$\delta=sin^{-1}(r/(2A)) \quad \text{Equation 20}$$

As seen from Equation 20, the phase difference angle δ changes along with changes in the disk rotational radial position of the head, i.e. the number of head traveling tracks r. Accordingly, the phase fluctuation of the home index mark reproducing signal may be obtained just by inputting r for a track being reproduced by calculating the phase difference angles δ for various values of r beforehand and storing them in the form of a table.

[5] Fifth Preferred Embodiment

Figure 31:
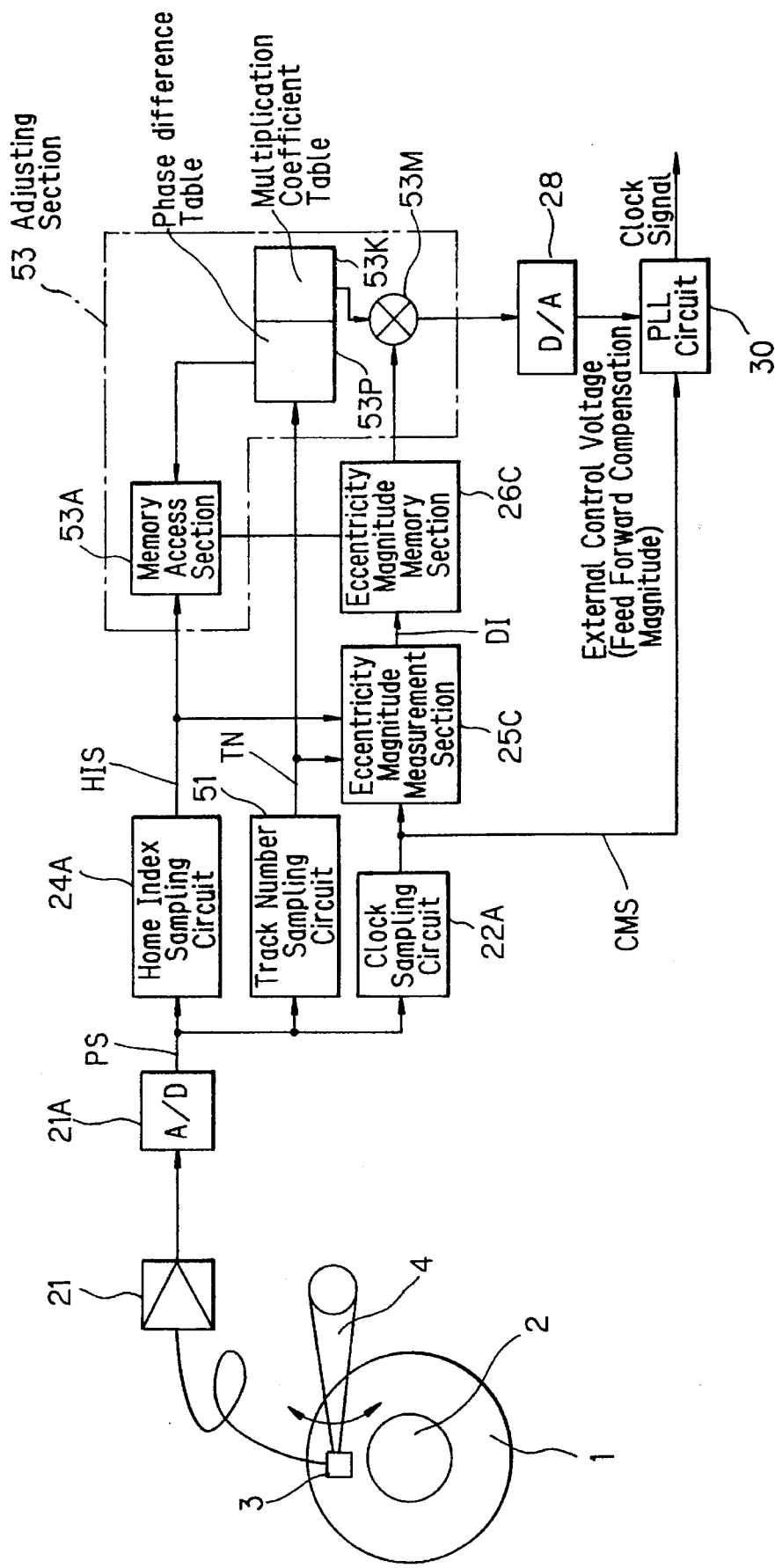
FIG. 31 is a block diagram illustrating a fifth embodiment of a disc device according to the present invention.

FIG. 31 is a block diagram showing the construction of a fifth embodiment of the disc device of the present invention.

In FIG. 31, a disk 1 on which N clock marks are recorded on each circular data track at equal intervals is chucked on a spindle 2. A recording and reproduction head 3 is mounted on a turnable arm 4 to move on the disk 1 to reproduce signals. The signals read out of the disk 1 by the head 3 are amplified by a reproduction and amplification circuit 21 and are converted into pulse signals PS at the TTL level by an A/D converting circuit 21A.

The pulse signals PS are supplied to a clock sampling circuit 22A, a home index sampling circuit 24A and a track number sampling circuit 51. The clock sampling circuit 22A samples a clock mark reproduced signal CMS from the pulse signals PS and supplies it to an eccentricity magnitude measuring section 25C and a PLL circuit 30. The home index sampling circuit 24A samples a home index reproduced signal HIS and supplies it to the eccentricity magnitude measuring section 25C and a memory access section 53A of an adjustment section 53. The track number sampling circuit 51 samples a head traveling track number TN from the pulse signals PS and supplies it to the eccentricity magnitude measurement section 25C and a phase difference table 53P and a multiplication coefficient table 53K of the adjustment section 53.

The eccentricity magnitude measuring section 25C calculates the eccentricity (decentering) information (the fixed position phase shift magnitude) around the head traveling track using the clock mark reproduced signal CMS, the home index reproduced signal HIS and the head traveling track number TN. It also converts this eccentricity information into standard eccentricity information DI in standard track numbers (for example the inner track), finds the eccentricity magnitude (table), and outputs it to the eccentricity magnitude memory section 26C.

A memory access section 53A in the adjustment section 53 outputs control and address signals to the eccentricity magnitude memory section 26C based on the home index reproduced signal HIS. The eccentricity magnitude memory section 26C memorizes the eccentricity DI output from the eccentricity magnitude measurement section 25C across the one circuit of the head traveling track according to the control and access signals from the memory access section 53A. The eccentric information memorized indicates the dislocation of the data track circle from the ideal locus circle.

The phase difference table 53P in the adjusting section 53 memorizes the phase difference angle δ between the home index position of the axis of rotation of the spindle and the home index mark recorded on the data track of the disk with the head traveling track number as an input parameter.

The head traveling track number corresponds to the rotational radial distance of the disc of the head of FIG. 30, i.e. the head traveling track radius r. Therefore, (Equation 20), the phase difference angle δ changes as the traveling track number changes. The phase difference table 53P stores the phase difference angles δ for values of various track numbers calculated beforehand in the form of a table and outputs the phase fluctuation of the home index mark reproducing signal as the phase difference angle δ when the number of the track being reproduced, i.e. along which the head is traveling is inputted.

The multiplication coefficient table 53K memorizes the values of the portion $2\pi/(\omega N)*2/r$ of Equation 19 when the head traveling track radius r which corresponds to the track number changes, as multiplication coefficients, in the form of a table.

When the head traveling track number TN is output from the track number sampling circuit 51, the phase difference table 53P outputs a phase difference δ which corresponds to its track number TN. The memory access section 53A outputs the control and address signals that correspond to the phase difference δ output from the phase difference table 53P to the eccentricity magnitude memory section 26C and corresponding to that, the eccentricity magnitude measurement section 25C supplies the eccentricity DI to one of the inputs of a multiplier 53M in the adjusting section 53. Meanwhile, the multiplication coefficient table 53K supplies the multiplication coefficient that corresponds to the head traveling track number TN supplied from the track number sampling circuit 51 to the other input terminal of the multiplier 53M. The multiplier 53M multiplies the eccentricity DI input with the multiplication coefficient. That is, the multiplier 53M changes and outputs the dislocation, i.e. the eccentricity magnitude, read out of the eccentricity magnitude memory section 26C, corresponding to the head traveling track number.

The eccentricity magnitude thus changed or adjusted is converted into an analog external control voltage by a D/A converting circuit 28 and applied to the PLL circuit 30 as a feed forward compensating value. The PLL circuit 30 changes the phase or frequency of the clock mark reproducing signal CMS in accordance with the input external control voltage. As a result, the embodiment shown in FIG. 31 allows the clock signal to follow up the eccentricity of the disk 1 with high accuracy.

[6] Sixth Preferred Embodiment

Figure 32:
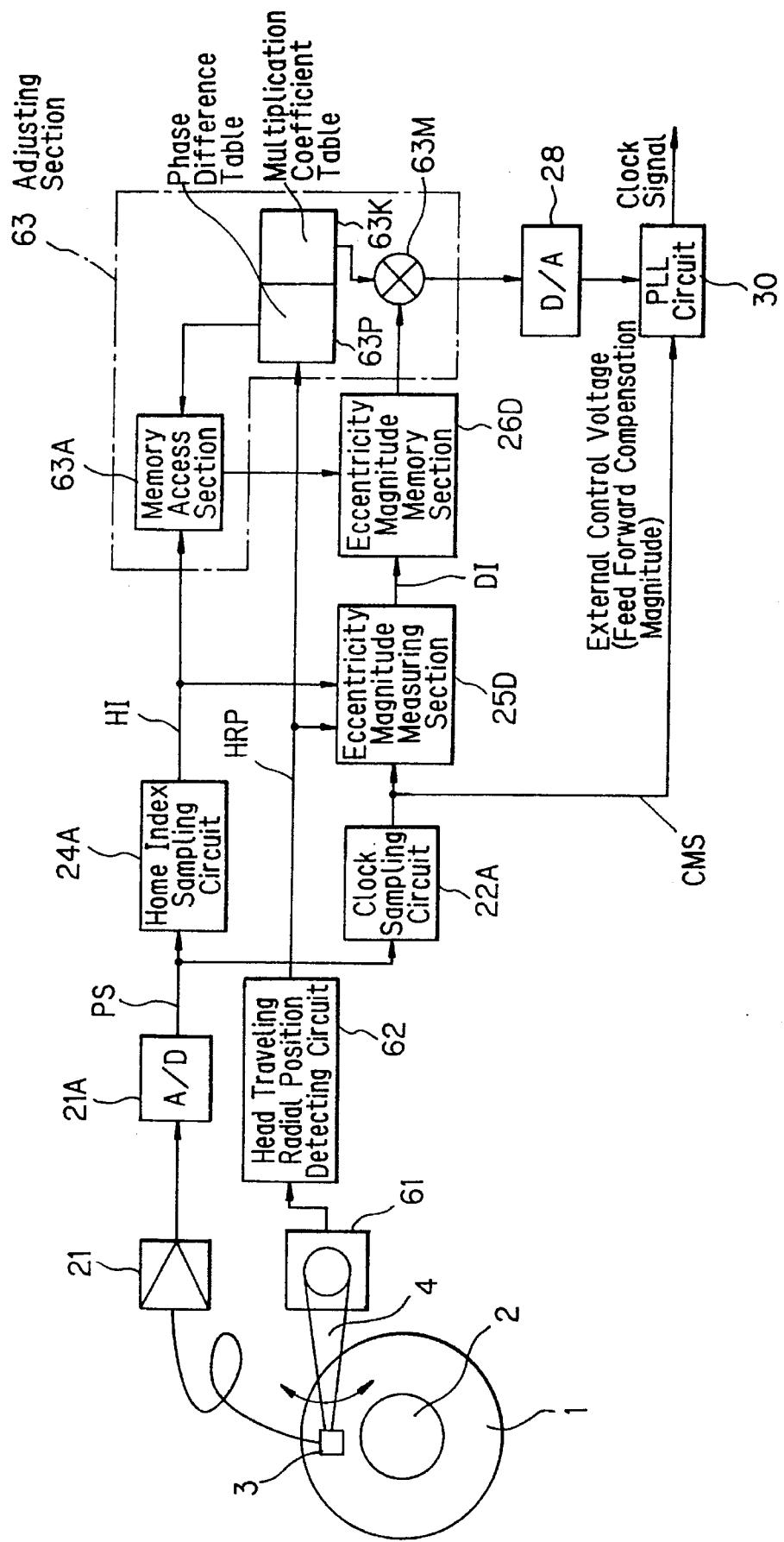
FIG. 32 is a block diagram illustrating a sixth embodiment of a disc device according to the present invention.

FIG. 32 shows the construction of a sixth embodiment of the disc device of the present invention.

The embodiment shown in FIG. 32 differs from that shown in FIG. 31 in that an angle sensor 61 and a head traveling radial position detecting circuit 62 are provided instead of the track number detecting circuit 51, an eccentricity magnitude measurement section 25D and eccentricity magnitude memory section 26D are provided instead of the eccentricity magnitude measurement section 25C, and an eccentricity magnitude memory section 26C and an adjusting section 63 containing a memory access section 63A, a multiplication section 63M, a phase difference table 63P and a multiplication coefficient table 63K are provided instead of the adjusting section 53 containing the memory access section 53A, the multiplication section 53M, the phase difference table 53P and the multiplication coefficient table 53K.

The angle sensor 61 is mounted on the axis of rotation of the arm 4 to detect a rotational angle of the arm 4. The head traveling radial position detecting circuit 62 finds the head traveling track radius r (see FIG. 9) based on the rotational angle of the arm 4 detected by the sensor 61, and outputs it to the eccentricity magnitude measurement section 25D, phase difference table 63P and multiplication coefficient table 63K as a head traveling radial position signal HRP.

The eccentricity magnitude measurement section 25D calculates the eccentricity information (phase shift magnitude at predetermined positions) around one circuit of the head traveling track, using the clock mark reproducing signal CMS, the home index reproducing signal HIS and the head traveling track radius r indicated by the head traveling radial position signal HRP. It also converts this eccentricity information into standard eccentricity information DI for a standard track number (for example the inner periphery track), finds the eccentricity magnitude (table), and outputs it to the eccentricity magnitude memory section 26D. The memory access section 63A in the adjusting section 63 outputs control and address signals to the eccentricity magnitude memory section 26D based on the home index reproduction signal HIS. The eccentricity magnitude memory section 26D memorizes the eccentricity DI output from the eccentricity magnitude measurement section 25D for one circuit of the head traveling track in accordance with the control and access signals from the memory access section 63A. The eccentricity information memorized indicates the dislocation of the data track circle from the ideal locus circle.

The phase difference table 63P in the adjusting section 63 memorizes the phase difference angle δ between the home index position of the axis of rotation of the spindle and the home index mark recorded on the data track of the disk with the head traveling track number as an input parameter. As seen from Equation 20, the phase difference angle δ changes as the head traveling track radius r changes. The phase difference table 63P stores the phase difference angle δ for various values of the radius r calculated beforehand in the form of a table and outputs the phase fluctuation of the home index mark reproducing signal as the phase difference angle δ when a radius r, of the track being reproduced or on which the head is traveling, is input.

The multiplication coefficient table 63K memorizes the values of the portion $2\pi/(\omega N)*2/r$ of Equation 19 when the radius r changes, as multiplication coefficients, in table form.

When the head traveling radial position signal HRP is output from the head traveling radial position detecting circuit 62, the phase difference table 63P outputs a phase difference δ which corresponds to the radius r which the head traveling radial position signal HRP indicates. The memory access section 63A outputs the control and address signals that correspond to the phase difference δ output from the phase difference table 63P to the eccentricity magnitude memory section 26D, and corresponding to that the eccentricity magnitude measurement section 25D supplies the eccentricity DI to one of the inputs of a multiplier 63M in the adjusting section 63. Also, the multiplication coefficient table 63K supplies a multiplication coefficient that corresponds to the head traveling radial position signal HRP, i.e. the radius r, supplied from the head traveling radial position detecting circuit 62, to the other input terminal of the multiplier 63M. The multiplier 63M multiplies the eccentricity DI input by the multiplication coefficient. That is, the multiplier 63M changes and outputs the dislocation, i.e. eccentricity, read out of the eccentricity magnitude memory section 26D corresponding to the radius r.

The eccentricity thus changed or adjusted is converted into an analog external control voltage by the D/A converting circuit 28 and applied to the PLL circuit 30 as a feed forward compensating value. The PLL circuit 30 changes the phase or frequency of the clock mark reproducing signal CMS in accordance with the input external control voltage. Accordingly, the embodiment shown in FIG. 31 allows the clock signal to follow up the eccentricity of the disk 1 with high accuracy.

As is clear from the description above, according to the embodiments shown in FIGS. 31 and 32, the correction of the frequency fluctuation of the reproduced clock signal with respect to the fluctuation of the unit radius, caused by the offset between the center of axis of rotation and that of the data track circle when the disk is chucked on the spindle, may be optimized.

Further, according to the embodiments shown in FIGS. 31 and 32, the phase error due to the traveling radial position of the signal reading head may be optimized when the phases of the reproduced signals of the home index of the axis of rotation of the spindle and the home index physically recorded on the data track circles of the disk differ in the track numbers, i.e. in the head traveling track position.

Although the embodiments described above are related to a magnetic disk unit, the present invention is not confined to that and may be applied to other disk units such as optical disk units.

As described above, according to the present invention, the phase or frequency of the clock signal output from the voltage controlled oscillator is corrected in accordance with a signal that corresponds to the eccentricity of the disk stored in the memory means, so that the clock signal correctly follows up the eccentricity of the disk.

And the signal that corresponds to the eccentricity of the disk memorized in the memory means is added to the output of the loop filter in synchronization with the rotation of the disk and is supplied to the voltage controlled oscillator, so that the clock signal correctly follows up the eccentricity of the disk.

Furthermore, an eccentricity is measured for each of the plurality of disk faces, a signal that corresponds to the eccentricity is stored in the memory means for each disk face, a signal that corresponds to the eccentricity of the disk face to be accessed from among the plurality of disk faces is selectively read out and the phase or frequency of the clock signal output from the voltage controlled oscillator is changed based on the read out signal that corresponds to the eccentricity. Therefore, when the disk face to be accessed is changed, the clock signal immediately follows up the eccentricity of the disk.

And, because the signal that corresponds to the eccentricity stored in the memory means is changed corresponding to the track number of the disk or the head position, and the phase or frequency of the clock signal output from the voltage controlled oscillator is changed according to this altered signal corresponding to the eccentricity, the clock signal follows up the eccentricity of the disk more correctly.

What is claimed is:

1. A disc device comprising:

a disc having data tracks containing information and a plurality of clock marks embedded in each of the data tracks during manufacture for providing a timing standard;

reproduction means including a reproduction head for reproducing the information recorded on the disc and the plurality of clock marks embedded in each of the data tracks of the disc, and producing an output signal therewith;

clock sampling means for extracting the clock marks from the output signal output by the reproduction means and generating a first clock signal therefrom;

eccentricity magnitude measuring means for obtaining eccentricity magnitudes of the data tracks with respect to an axis of rotation of the disc by using the first clock signal corresponding to the extracted clock marks and the output signal of the reproduction means;

converting means for converting a signal corresponding to the eccentricity magnitudes obtained by the eccentricity magnitude measuring means into a velocity signal;

eccentricity magnitude memory means for storing the velocity signal corresponding to the eccentricity magnitudes of the data tracks with respect to the axis of rotation of the disc; and clock correction means including voltage control oscillator means and responsive to the stored velocity signal corresponding to the eccentricity magnitudes, a second clock signal being output by the voltage control oscillator means to adapt to the first clock signal by changing one of the phase and the frequency of the second clock signal.

2. A disc device according to claim 1, wherein the disc also has recorded in the data tracks a home index signal and further comprising:

home index sampling means for sampling the output signal produced by the reproduction means and generating a home index signal representing a rotational phase origin of the disc.

3. A disc device according to claim 2, wherein the eccentricity magnitude measuring means obtains a eccentricity magnitude using a phase difference between the first clock signal at a first angular position on the disc and the first clock signal at a second angular position on the disc which is expressed as an equation, and using the home index signal as a reference.

4. A disc device according to claim 3, wherein the clock correction means further comprises:

phase comparison means for comparing a phase of the first clock signal with a phase of the second clock signal;

filter means for filtering an output of the phase comparison means;

adding means for adding in synchrony with the disc rotation an output from the filter means and the signal corresponding to the eccentricity and supplying a resulting sum signal to the voltage control oscillator means.

5. A disc device according to claim 3, wherein the clock correction means comprises:

phase comparison means for comparing a phase of the first clock signal with a phase of the second clock signal;

conversion means for converting the eccentricity magnitude stored in the eccentricity magnitude memory means into position signal;

adding means for adding in synchrony with the rotation of the disc the position signal and the output of the phase comparison means; and filter means for performing prescribed filtering on an output of the adding means.

6. A disc device according to claim 1, wherein the eccentricity magnitude measuring means obtains the signal corresponding to the eccentricity by calculating the number of tracks which the reproduction head crosses.

7. A disc device according to claim 1, wherein the eccentricity magnitude measuring means obtains the signal corresponding to the eccentricity from a non-uniformity of spacing observed in a string of originally uniformly spaced clock pulses reproduced from the disc.

8. A disc device according to claim 1, wherein the eccentricity magnitude measuring means obtains the signal corresponding to the eccentricity by calculating pulse periods where the radius of the disc is at its minimum and its maximum due to the eccentricity.

9. A disc device according to claim 1, wherein the eccentricity magnitude measuring means comprises:

time interval measuring means for measuring time intervals of clock mark reproduction signals output by the reproduction head when the reproduction head is positioned at a fixed radius from the center of rotation of the disc;

eccentricity magnitude computing means for obtaining the distances between the circular data tracks and the locus of the reproduction head when the disc rotates from the time intervals of the clock mark reproduction signal measured by the time interval measuring means; and wherein the eccentricity magnitude memory means stores the distances obtained by the eccentricity magnitude computing means with the corresponding disc rotation angles as the signal corresponding to the eccentricity.

10. A disc device according to claim 9, wherein the time interval measuring means measures the time interval between the $(n+m)^{th}$ (where n is an integer from 1 to N) clock mark reproduction signal and the $(n+m+1)^{th}$ clock mark reproduction signal for all integers m from m=0 to m=(N+N/2−1), and wherein the eccentricity magnitude computing means further comprises:

time interval memory means for storing the measured time intervals;

subtracting means for subtracting the $(p+N/2)^{th}$ time interval measured value from the $p^{th}$ time interval measured value stored in the time interval memory means for all integers p from p=1 to p=N; and wherein the eccentricity magnitude memory means stores subtraction results obtained by the subtraction means.

11. A disc device according to claim 9, wherein the eccentricity magnitude measuring means further comprises:

moving average means for averaging the time intervals between the clock mark reproduction signals corresponding to adjacent clock mark signals recorded on the disc, an average being taken over the prescribed number of clock signals in half a revolution of the disc, and outputting an average value indicating this average; and subtraction means for obtaining the difference between average values output by the moving average means for different angular portions of the disc.

12. A disc device according to claim 9, wherein the time interval measuring means measures the time interval between the clock mark reproduction signals at the prescribed angular positions on the disc and the $m^{th}$ clock mark signal for all integers m from m=1 to m=(N+N/2), and wherein the eccentricity magnitude computing means comprises:

time interval memory means for storing the measured time intervals;

first subtraction means for subtracting the $(p+N/2)^{th}$ time interval measured value from the $p^{th}$ time interval measured value stored in the time interval memory means for all integers p from p=1 to p=N;

subtraction result memory means for storing subtraction results obtained by the first subtraction means;

averaging means for obtaining an average of N subtraction results stored in the subtraction result memory means;

second subtracting means for subtracting an average value obtained by the averaging means from the $k^{th}$ subtraction result stored in the subtraction result memory for all integers k from k=1 to k=N; and wherein the eccentricity magnitude memory means stores subtraction results obtained by the second subtraction means.

13. A disc device according to claim 9, wherein the time interval measuring means measures the time interval between the $(n+m)^{th}$ (where n is an integer from 1 to N) clock mark reproduction signal and the $(n+m+N/2)^{th}$ clock mark reproduction signal for all integers m from m=0 to m=(N−1) and wherein the eccentricity magnitude computing means comprises:

time interval memory means for storing the measured time intervals;

averaging means for obtaining an average value of N time intervals stored in the time interval memory means;

subtraction means for subtracting an average value obtained by the averaging means from the $p^{th}$ time interval value stored in the time interval memory means for all integers p from p=1 to p=N; and wherein the eccentricity memory means stores subtraction results obtained by the subtraction means.

14. A disc device according to claim 9, wherein the time interval measuring means measures the time interval between the $(n+m)^{th}$ (where n is an integer from 1 to N) clock mark reproduction signal and the $(n+m+1)^{th}$ clock mark reproduction signal for all integers m from m=0 to m=(N+N/2−1), and wherein the eccentricity magnitude computing means comprises:

time interval memory means for storing the measured time intervals;

adding means for adding N/2 values from the $p^{th}$ time interval value to the $(p+N/2)^{th}$ value stored in the time interval memory means for all integers p from p=1 to p=N;

adding result memory means for storing adding results obtained by the adding means;

averaging means for obtaining the average value of N adding results stored in the adding result memory means;

subtracting means for subtracting an average value obtained by the averaging means from the $k^{th}$ adding result stored in the adding result memory means for all integers k from k=1 to k=N; and wherein the eccentricity magnitude memory means stores subtraction results obtained by the subtraction means.

15. A disc device according to claim 9, wherein the eccentricity measuring means comprises:

time interval measuring means for measuring the time intervals between adjacent clock mark reproduction signals output by the reproduction head when the reproduction head is positioned at a fixed radius from the center of rotation of the disc;

first computing means for obtaining the distance between the center of the circular tracks and the center of rotation of the disc from the time intervals between the clock mark reproduction signals measured by the time interval measuring means;

phase difference lead-through means for leading through a phase difference between the position on the disc where the time interval measured by the time interval measuring means is greatest and the position on the disc where the home index signal is recorded; and second computing means for computing the eccentricity magnitude with angular position of the disc from the distance obtained by the first computing means and the phase difference led through by the phase difference lead-through means.

16. A disc device according to claim 1, further comprising second memory means for storing temporarily the eccentricity magnitudes obtained by the eccentricity magnitude measuring means, wherein the second memory means supplies the signal corresponding to the eccentricity magnitudes to the converting means.

17. A disc device, comprising:

a plurality of discs each disc having a plurality of disc sides and each disc side having data tracks containing information and a plurality of clock marks embedded in each of the data tracks during manufacture to provide a timing standard;

reproduction means including a respective plurality of reproduction heads corresponding to the plurality of discs for reproducing information recorded on the plurality of discs and the plurality of clock marks embedded in each of the data tracks of the plurality of disc sides;

clock sampling means for generating a first clock signal by using clock marks reproduced by the reproduction means;

eccentricity magnitude measuring means for obtaining separately for each disc eccentricity magnitudes of the data tracks with respect to the axis of rotation of the disc by using the first clock signal and the clock marks reproduced by the reproduction means;

converting means for converting the eccentricity magnitudes obtained by the eccentricity magnitude measuring means into corresponding velocity signals;

eccentricity magnitude memory means for storing for each side of each disc the velocity signals corresponding to the eccentricity magnitudes from the eccentricity magnitude measuring means;

selecting means for selectively reading out from the eccentricity magnitude memory means a compensating signal corresponding to the eccentricity magnitudes of a disc side of one of the plurality of discs which is to be accessed;

control means for controlling an appropriate one of the plurality of reproduction heads to reproduce the disc side of the one of the plurality of discs which is to be accessed, and controlling the selecting means to read out the eccentricity magnitudes of the disc side of the one of the plurality of discs which is to be accessed; and clock correction means including voltage controlled oscillator means and responsive to the compensating signal corresponding to the eccentricity magnitudes read out by the selecting means for causing a second clock signal output by the voltage controlled oscillator to adapt to the first clock signal by changing one of the phase and the frequency of the second clock signal.

18. A disc device according to claim 17, wherein each of the data tracks on both sides of each of the discs is provided with a plurality of clock marks for providing a timing standard.

19. A disc device, comprising:

a plurality of discs each disc having data tracks containing information and each provided with a plurality of clock marks for providing a timing standard;

reproduction means including a reproduction head for reproducing information recorded on the discs;

track number sampling means for sampling track numbers of the disc from an output signal reproduced by the reproduction means;

clock sampling means for sampling a first clock signal from the output signal of the reproduction means;

eccentricity magnitude measuring means for obtaining a signal corresponding to the eccentricity of the data tracks of each disc with respect to the axis of rotation of the disc from the first clock signal and the output signal of the reproduction means;

eccentricity magnitude memory means for storing the signal corresponding to the eccentricity;

eccentricity magnitude adjusting means for changing the signal corresponding to the eccentricity stored in the eccentricity magnitude memory means according to the sampled track number; and clock correction means including a voltage controlled oscillator means and responsive to the signal corresponding to the eccentricity changed by the eccentricity adjusting means for causing a second clock signal output by the voltage controlled oscillator to follow the first clock signal by changing one of the phase and the frequency of the second clock signal.

20. A disc device according to claim 19, further comprising:

home index sampling means for sampling a home index signal indicating the rotational phase origin of the disc from the output of the reproduction means.

21. A disc device according to claim 20, wherein the signal corresponding to the eccentricity is a signal in which the phase difference between the clock signal at prescribed angular positions on the disc and the first clock signal is expressed as an equation and which has the home index signal generation position as its reference origin.

22. A disc device according to claim 21, wherein the eccentricity magnitude adjusting means comprises:

adjustment coefficient memory means for storing in correspondence with the sampled track numbers amplitudes of the time intervals of the clock mark reproduction signals as adjustment coefficients for use in adjusting the signal corresponding to the eccentricity;

multiplying means for multiplying the signal corresponding to the eccentricity stored in the eccentricity magnitude memory means by the adjustment coefficients stored in the adjustment coefficient memory means.

23. A disc device according to claim 22, further comprising:

phase difference memory means for storing in correspondence with sampled track numbers a phase difference between the home index of the axis of rotation of the disc and the home index on the data tracks, and for outputting the phase differences according to input track numbers; and readout means for reading out according to the phase difference output by the phase difference memory means signals corresponding to the eccentricity and supplying them to the multiplying means.

24. A disc device, comprising:

a plurality of discs each disc having data tracks containing information and each provided with a plurality of clock marks for providing a timing standard;

reproduction means including a reproduction head for reproducing the information recorded on the discs;

head position detecting means for detecting a position of the reproduction head;

clock sampling means for extracting a first clock signal from clock marks reproduced by the reproduction means;

eccentricity magnitude measuring means for measuring the eccentricity of the data tracks of each disc with respect to the axis of rotation of the disc from the first clock signal and the clock marks reproduced by the reproduction means;

eccentricity magnitude memory means for storing a signal corresponding to the eccentricity;

eccentricity magnitude adjusting means for changing the signal corresponding to the eccentricity stored in the eccentricity magnitude memory means according to the head position;

clock correction means including a voltage controlled oscillator means and responsive to the signal corresponding to the eccentricity changed by the eccentricity adjusting means for causing a second clock signal output by the voltage controlled oscillator to follow the first clock signal by changing one of the phase and the frequency of the second clock signal.

25. A disc device according to claim 24, further comprising:

home index sampling means, for sampling a home index signal indicating the rotational phase origin of the disc.

26. A disc device according to claim 25, wherein the signal corresponding to the eccentricity is a signal in which a phase difference between the clock signal at prescribed angular positions on the disc and the first clock signal is expressed as an equation and which has the home index signal generation position as its reference origin.

27. A disc device according to claim 26, wherein the eccentricity magnitude adjusting means comprises:

adjustment coefficient memory means for storing in correspondence with the detected head position the amplitudes of the time intervals of the clock mark reproduction signals as adjustment coefficients for use in adjusting the signal corresponding to the eccentricity;

multiplying means for multiplying the signal corresponding to the eccentricity stored in the eccentricity magnitude memory means by the adjustment coefficients stored in the adjustment coefficient memory means.

28. A disc device according to claim 27, further comprising:

phase difference memory means for storing in correspondence with the detected head position the phase difference between the home index of the axis of rotation of the disc and the home index on the data tracks, and for outputting the phase difference according to input track number; and readout means for according to the phase difference output by the phase difference memory means, reading out a signal corresponding to the eccentricity and supplying it to the multiplying means.

* * * * *